(12) United States Patent
Miyamoto et al.

(10) Patent No.: US 9,418,461 B2
(45) Date of Patent: Aug. 16, 2016

(54) CHARACTER STRING PLACEMENT DEVICE

(75) Inventors: Ken Miyamoto, Tokyo (JP); Shoichiro Kuboyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 195 days.

(21) Appl. No.: 14/129,800

(22) PCT Filed: Aug. 15, 2011

(86) PCT No.: PCT/JP2011/004583
§ 371 (c)(1),
(2), (4) Date: Dec. 27, 2013

(87) PCT Pub. No.: WO2013/024505
PCT Pub. Date: Feb. 21, 2013

(65) Prior Publication Data
US 2014/0152670 A1    Jun. 5, 2014

(51) Int. Cl.
*G06T 11/00* (2006.01)
*G09G 5/24* (2006.01)
(Continued)

(52) U.S. Cl.
CPC .............. *G06T 11/60* (2013.01); *G09B 29/106* (2013.01); *G09G 5/026* (2013.01); *G09G 5/14* (2013.01);
(Continued)

(58) Field of Classification Search
USPC ......................................................... 345/467
See application file for complete search history.

(56) References Cited

U.S. PATENT DOCUMENTS

| 2003/0197626 | A1* | 10/2003 | Endo | G01C 21/3635 340/995.1 |
| 2004/0049335 | A1* | 3/2004 | Schmidt | G01C 21/3461 701/431 |

(Continued)

FOREIGN PATENT DOCUMENTS

| JP | 5-80742 | 4/1993 |
| JP | 9-146529 | 6/1997 |

(Continued)

OTHER PUBLICATIONS

Edmondson, et al., "A General Cartographic Labeling Algorithm", The International Journal for Geographic Information and Geovisualization, vol. 33, No. 4, 1996, 19 pages.

(Continued)

*Primary Examiner* — Phi Hoang
*Assistant Examiner* — Yi Yang
(74) *Attorney, Agent, or Firm* — Oblon, McClelland, Maier & Neustadt, L.L.P

(57) ABSTRACT

Disclosed is a character string placement device including an evaluation function calculator that calculates a plurality of evaluation function values, each of which shows an evaluation of placement of a character string placed at each of a plurality of candidate points on a node series; and a minimum evaluation function value storer that determines at which of the plurality of candidate points to place the character string on a basis of comparison between the plurality of evaluation function values calculated by the evaluation function calculator. The evaluation function calculator includes: a character gap function calculator that calculates a character gap function value; an angle function calculator that calculates an angle function value; and an evaluation function value calculator that calculates the evaluation function value of the character string placed at each of the plurality of candidate points based on the character gap function value and the angle function value.

15 Claims, 23 Drawing Sheets

(51) Int. Cl.
  *G06T 11/60* (2006.01)
  *G09B 29/10* (2006.01)
  *G09G 5/02* (2006.01)
  *G09G 5/14* (2006.01)
  *G09G 5/34* (2006.01)
  *G09G 5/32* (2006.01)

(52) U.S. Cl.
  CPC .................. *G09G 5/346* (2013.01); *G09G 5/32* (2013.01); *G09G 2340/10* (2013.01); *G09G 2340/12* (2013.01)

(56) References Cited

U.S. PATENT DOCUMENTS

| | | | | |
|---|---|---|---|---|
| 2006/0195255 A1* | 8/2006 | Kim | .................... | G01C 21/3673 701/457 |
| 2007/0021911 A1* | 1/2007 | Kikuchi | ............. | G01C 21/3673 701/455 |
| 2009/0024319 A1* | 1/2009 | Tsuji | .................. | G01C 21/3673 701/533 |
| 2009/0074268 A1* | 3/2009 | Tanaka | .................. | G06T 7/0012 382/128 |
| 2010/0174514 A1* | 7/2010 | Melkumyan | ............ | G06F 17/18 703/2 |
| 2010/0198823 A1* | 8/2010 | Tsoukalas | ............. | G06F 17/241 707/736 |

FOREIGN PATENT DOCUMENTS

| | | |
|---|---|---|
| JP | 9-237034 | 9/1997 |
| JP | 2004-246357 | 9/2004 |
| JP | 2007-156101 | 6/2007 |
| JP | 2009-25048 | 2/2009 |
| WO | WO 2005/036503 A1 | 4/2005 |

OTHER PUBLICATIONS

International Search Report issued Sep. 13, 2011, in PCT/JP11/004583 filed Aug. 15, 2011.

Japanese Office Action issued Jun. 24, 2014, in Japan patent Application No. 2013-528842 (with English translation).

* cited by examiner

■ : Character String Placement Start Point

●——● : Road Node Series

東海道 : Character String (a)

(b)

(c)

(a)

|  | overlap(i) |
|---|---|
| 東海道 | 1 |
| 中央道 | 2 |
| 甲州道 | 1 |

$i$ : Character String (b)

● : Road Node Along Which Character String Is Placed
― : Road Link Along Which Character String Is Placed $AveLine(i)$ : Linear Approximation Of Road Node Along Which Character String Is Placed
$flatness(i)$ : Sum Total of Areas Of Parts ▲ ÷ Length Of $AveLine(i)$

CHARACTER STRING PLACEMENT DEVICE

FIELD OF THE INVENTION

The present invention relates to a character string placement device that places a character string on a graphic such as a map.

BACKGROUND OF THE INVENTION

A conventional map display device has a function of placing a character string, such as a road name, from a point where the placement of the character string is started (referred to as a character string placement start point from here on) along a road line (referred to as a road node series from here on) (for example, refer to FIG. 21). In this case, when the character string placement start point is not appropriate, an overlap between the character string and another character string as shown in FIG. 22(a), a reduction in the readability due to a change in the display angle of a character as shown in FIG. 22(b), and a reduction in the readability due to a high degree of closeness between the character string and another character string as shown in FIG. 22(c) take place.

As a method of solving such an overlap between character strings as shown in FIG. 22(a), and such a reduction in the readability as shown in FIG. 22(b), for example, a method of changing a character string placement start point to a position having high readability is described in nonpatent reference 1. Concretely, the method is the one of changing a character string placement start point by minimizing an evaluation function f shown by the following equation (1) and consisting of both a function overlap(i) showing an overlap between character strings as shown in FIG. 23(a) and a function flatness(i) showing a variation in the angle of a road node series along which a character string is placed as shown in FIG. 23(b). $\alpha 1$ and $\alpha 2$ in the equation (1) are parameters for adjusting the values of overlap(i) and flatness(i) respectively, and String_num shows the number of character strings.

$$f = \sum_{i}^{String\_num} \alpha_1 \text{overlap}(i) + \alpha_2 \text{flatness}(i) \quad (1)$$

RELATED ART DOCUMENT

Nonpatent Reference

Nonpatent reference 1: Shawn Edmondson, "A General Cartographic Labeling Algorithm", The International Journal for Geographic Information and Geovisualization, Volume 33, Number 4/Winter 1996

SUMMARY OF THE INVENTION

Problems to be Solved by the Invention

A problem with the method disclosed in the above-mentioned nonpatent reference 1 is, however, that because the method is provided to simply solve an overlap between character strings as shown in FIG. 22(a) and a reduction in the readability due to a variation in the angle of a road along which a character string is placed as shown in FIG. 22(b), a reduction in the readability due to a high degree of closeness between character strings as shown in FIG. 22(c) cannot be avoided.

The present invention is made in order to solve the above-mentioned problem, and it is therefore an object of the present invention to provide a character string placement device that changes a character string placement start point to an optimal position by taking into consideration not only an overlap between character strings and a variation in the display angle of a character, but also the degree of closeness between character strings.

Means for Solving the Problem

In accordance with the present invention, there is provided a character string placement device including: an evaluation function calculator that calculates a plurality of evaluation function values, each of which shows an evaluation of placement of a character string placed at each of a plurality of candidate points on a node series; and a minimum evaluation function value storer that determines at which of the plurality of candidate points to place the character string on a basis of comparison between the plurality of evaluation function values calculated by the evaluation function calculator, wherein the evaluation function calculator includes: a character gap function calculator that calculates a character gap function value for evaluating a distance between the character string placed at each of the plurality of candidate points and another character string placed at another node series, which us different from the node series on winch the plurality of candidate points are placed; an angle function calculator that calculates an angle function value showing an evaluation of an angle of the node series along which the character string is placed at each of the plurality of candidate points; and an evaluation function value calculator that calculates the evaluation function value of the character string placed at each of the plurality of candidate points on a basis of the character gap function value and the angle function value.

Advantages of the Invention

The character string placement device in accordance with the present invention can prevent a reduction of the readability due to an overlap between character strings and a change of the display angle of a character, and can also prevent the degree of closeness between character strings from becoming high, thereby being able to improve the visibility of each character string.

EMBODIMENTS OF THE INVENTION

Hereafter, in order to explain this invention in greater detail, the preferred embodiments of the present invention will be described with reference to the accompanying drawings. Embodiment 1.

Figure 1:
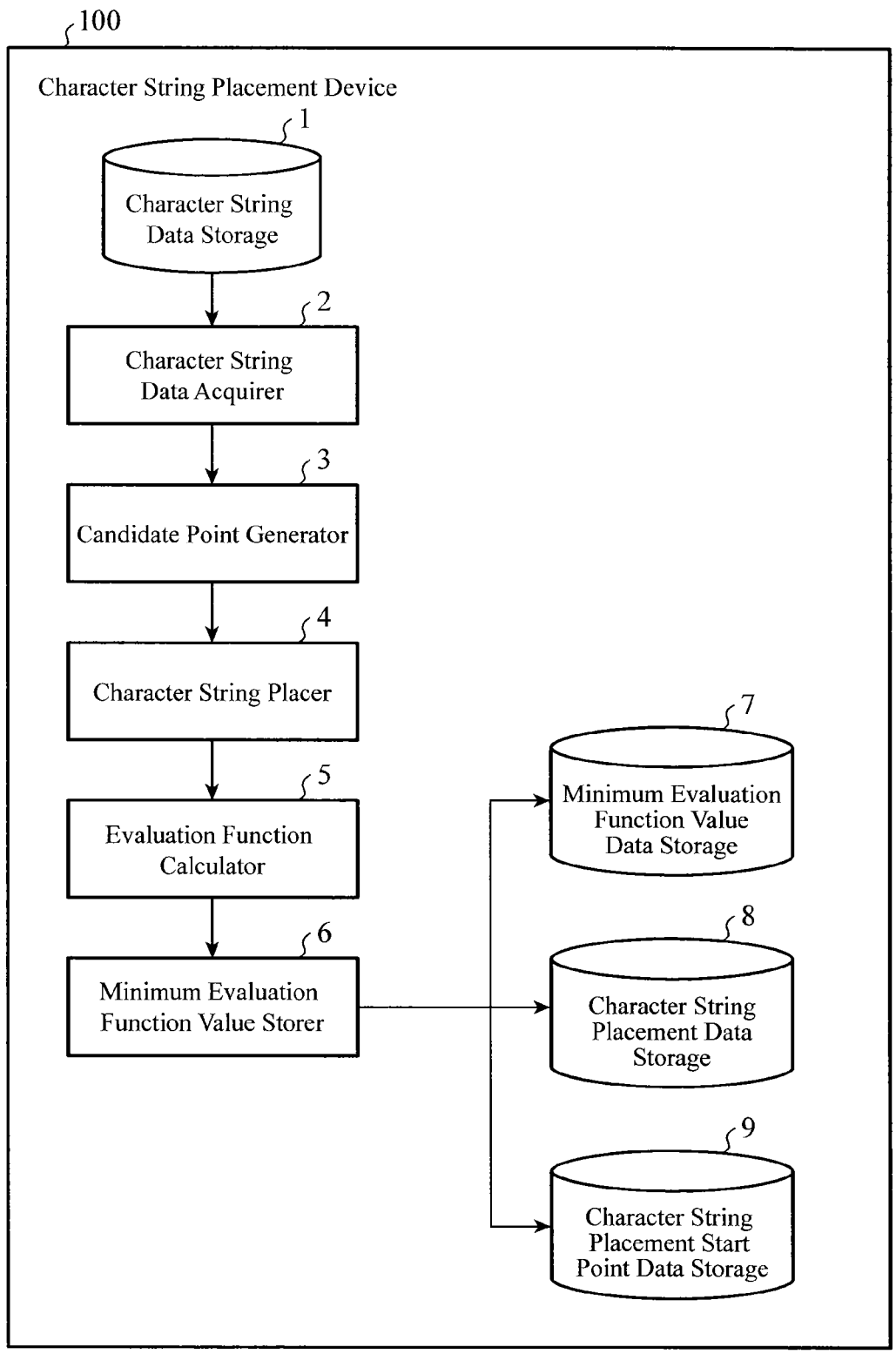
FIG. 1 is a block diagram showing the structure of a character string placement device in accordance with Embodiment 1.

FIG. 1 is a block diagram showing the structure of a character string placement device in accordance with Embodiment 1 of the present invention. The character string placement device 100 is comprised of a character string data storage 1, a character string data acquirer (data acquirer) 2, a candidate point generator 3, a character string placer 4, an evaluation function calculator 5, a minimum evaluation function value storer 6, a minimum evaluation function value data storage 7, a character string placement data storage 8, and a character string placement start point data storage 9.

The character string data storage 1 is a storage area for storing a set of data about a plurality of character strings, and stores the number of character strings, the number of characters included in each of the character strings, the width and the height of each of the characters, and a road node series along which each of the character strings is to be placed. The character string data acquirer 2 acquires character string data stored in the character string data storage 1. The candidate point generator 3 generates two or more placement candidates (referred to as candidate points from here on) for the character string on a road node along which the character string is to be placed. The character string placer 4 places the character string along the road node series from each of the candidate points.

The evaluation function calculator 5 evaluates the readability of a character string which is placed. The minimum evaluation function value storer 6 stores, in each storage area, an evaluation function value, character string placement, and a character string placement start point at a time when an evaluation function has a minimum. The minimum evaluation function value data storage unit 7 is a storage area for storing the minimum evaluation function value. The character string placement data storage unit 8 is a storage area for storing the character string placement at the time that the evaluation function has the minimum evaluation function value. The character string placement start point data storage unit 9 is a storage area for storing the character string placement start point at the time that the evaluation function value is a minimum.

Figure 2:
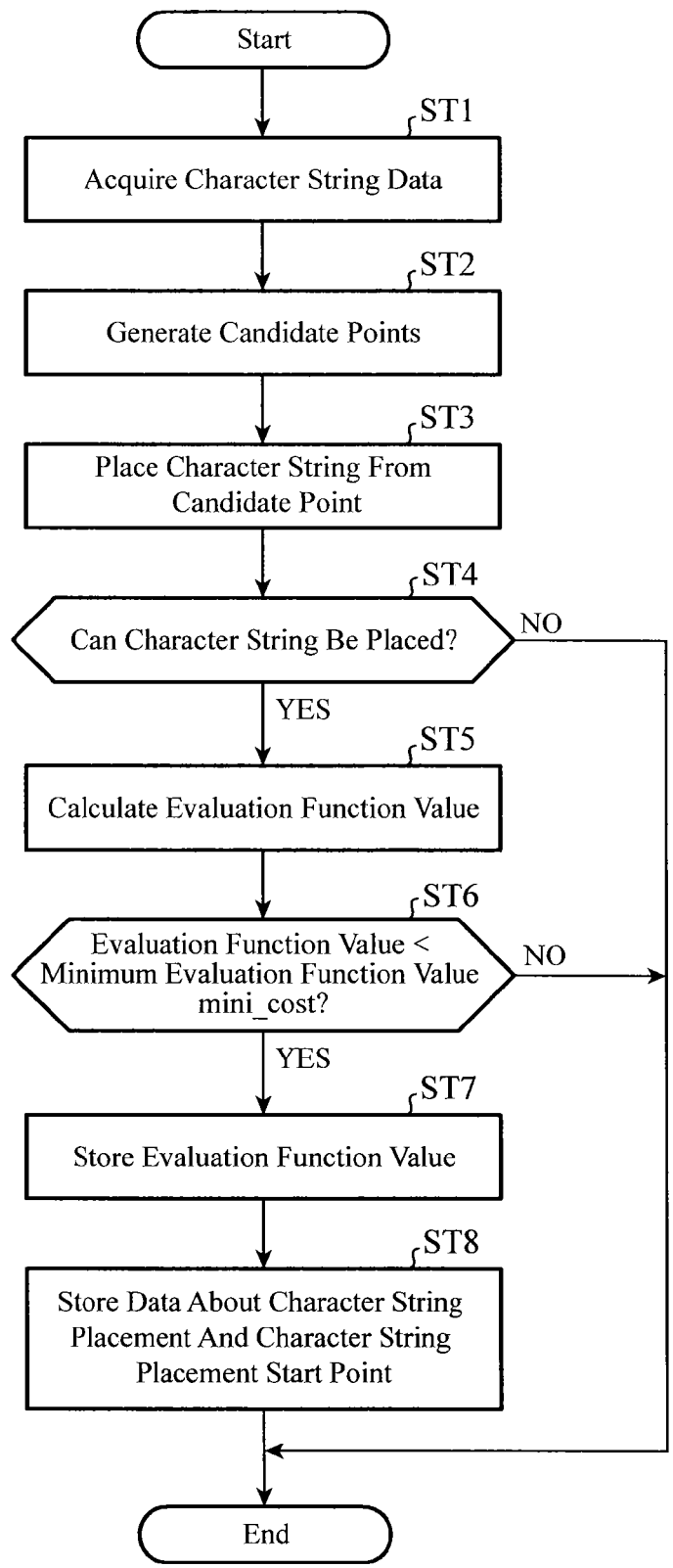
FIG. 2 is a flow chart showing the operation of the character string placement device in accordance with Embodiment 1.

Next, the operation of the character string placement device will be explained. FIG. 2 is a flow chart showing the operation of the character string placement device in accordance with Embodiment 1 of the present invention. The character string data acquirer 2 refers to character string data storage 1 to acquire the character string data about a character string to be placed (step ST1). The candidate point generator 3 generates candidate points from each of which the character string acquired in step ST1 is to be placed on the road node series along which the character string is to be placed (step ST2). The character string placer 4 places the character string from each of the candidate points generated in step ST2 along the road node series (step ST3). The character string placer 4 further refers to the result of the placement in step ST3, and determines whether or not the character string can be placed along the road node series (step ST4). For example, when the character string is placed while extending off the road node series, the character string placer determines that the character string cannot be placed. When the character string placer determines that the character string cannot be placed along the road node series (when NO in step ST4), the character string placement device ends the processing.

In contrast, when the character string placer determines that the character string can be placed along the road node series (when YES in step ST4), the evaluation function calculator 5 calculates the evaluation function value of the character string which is placed (step ST5). The minimum evaluation function value storer 6 determines whether or not the evaluation function value calculated in step ST5 is less than a minimum evaluation function value mini_cost already stored in the minimum evaluation function value data storage unit 7 (step ST6). When the evaluation function value is equal to or greater than the minimum evaluation function value mini_cost (when NO in step ST6), the character string placement device ends the processing. In contrast, when the evaluation function value is less than the minimum evaluation function value mini_cost (when YES in step ST6), the minimum evaluation function value storer 6 stores the evaluation function value calculated in step ST5 in the minimum evaluation function value data storage 7 (step ST7) and stores data about the character string placement and data about the character string placement start point in the character string placement data storage 8 and in the character string placement start point data storage 9 respectively (step ST8), and the character string placement device ends the processing.

Figure 3:
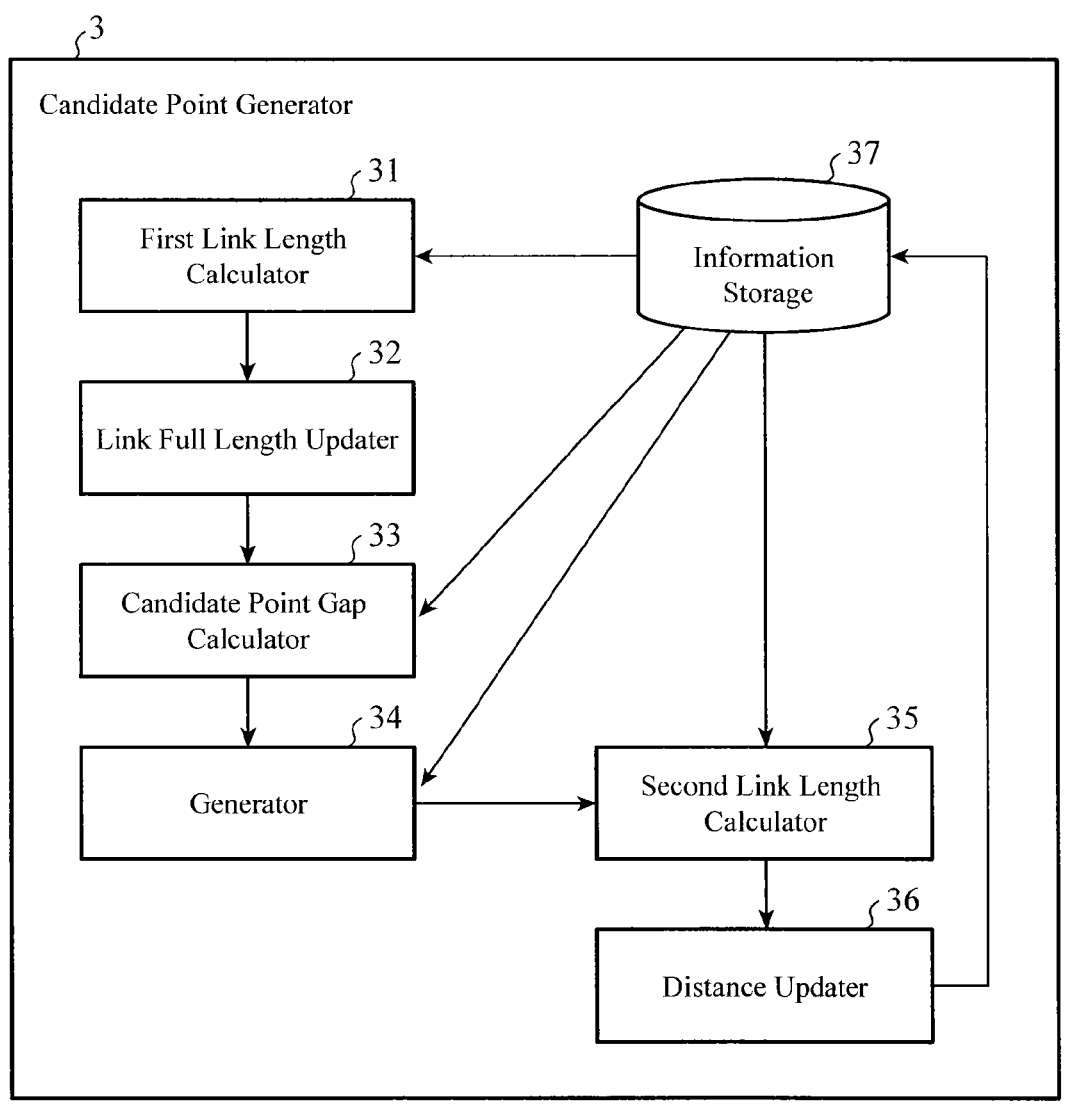
FIG. 3 is a block diagram showing the structure of a candidate point generator of the character string placement device in accordance with Embodiment 1.
Figure 4:
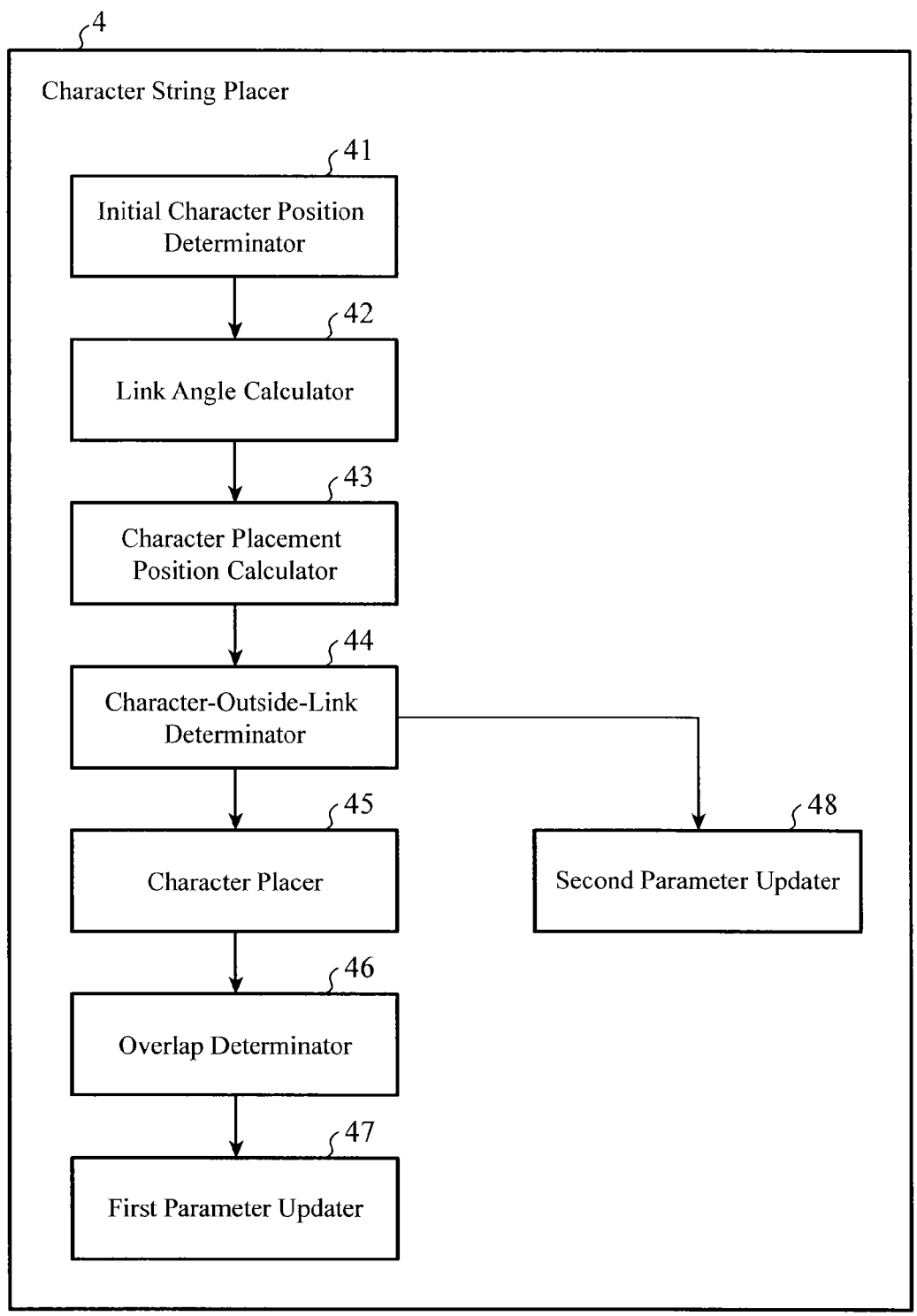
FIG. 4 is a block diagram showing the structure of a character string placer of the character string placement device in accordance with Embodiment 1.
Figure 5:
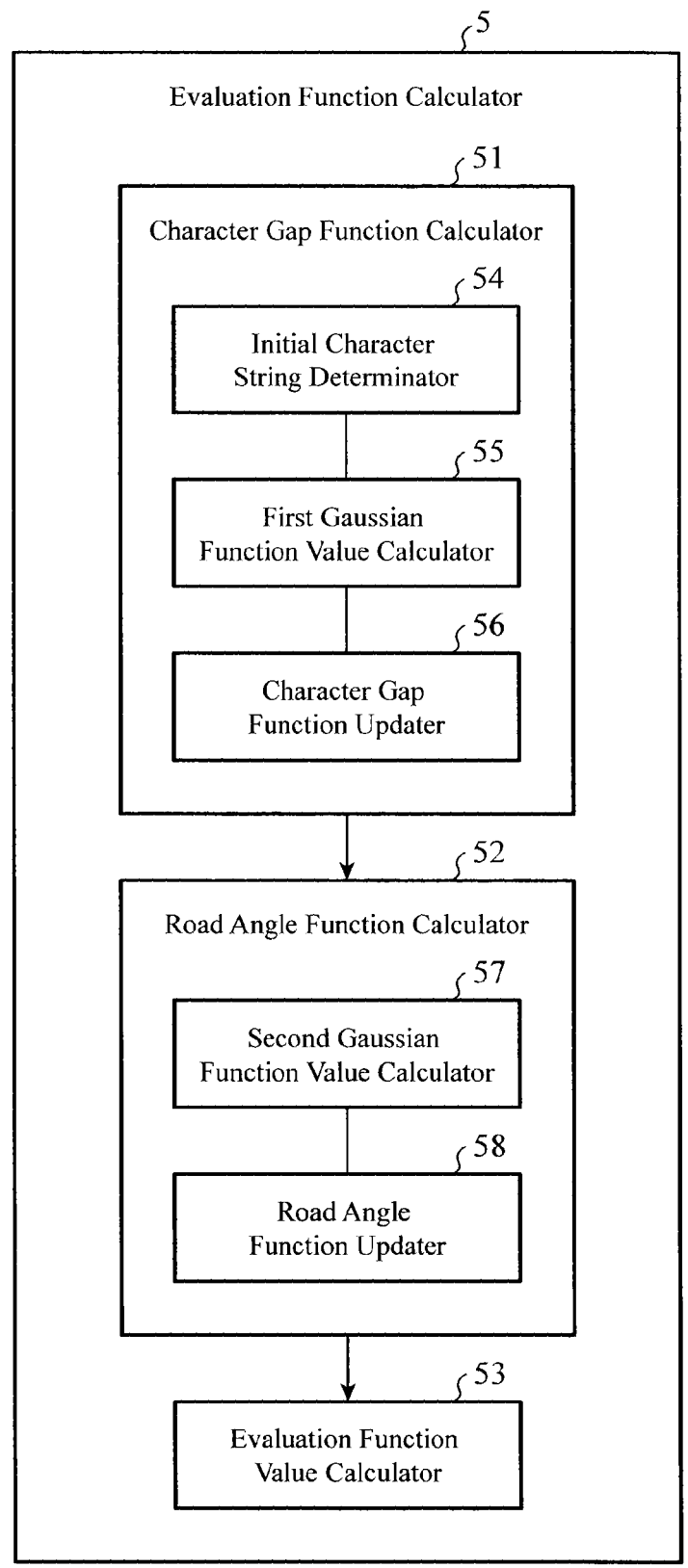
FIG. 5 is a block diagram showing the structure of an evaluation function calculator of the character string placement device in accordance with Embodiment 1.

Next, a more detailed structure and a more detailed operation of the character string placement device 100 will be explained. FIGS. 3 to 5 are block diagrams showing each structural component of the character string placement device 100 in details. FIG. 3 is a block diagram showing the structure of the candidate point generator 3, FIG. 4 is a block diagram showing the structure of the character string placer 4, and FIG. 5 is a block diagram showing the structure of the evaluation function calculator 5. First, as shown in FIG. 3, the candidate point generator 3 is comprised of a first link length calculator 31 that calculates the length of each link connecting between two nodes in the road node series, a link full length updater 32 that adds the length of each link calculated by the first link length calculator 31 to determine the full length of the road node series, a candidate point gap calculator 33 that calculates the gap between candidate points from the full length of the links road node series, a generator 34 that generates candidate points on the road node series, a second link length calculator 35 that, when the length of a set link does not satisfy a predetermined condition, changes the nodes and calculates the length of another link, a distance updater 36 that updates the link length on the basis of the length of the other link calculated by the second link length calculator 35, and an information storage unit 37 that stores information about candidate points including the candidate point gap (cand_gap), a candidate point number (cand_idx), and the length (dist) of a link connecting from the leading node of the road node series to a predetermined node.

Next, as shown in FIG. 4, the character string placer 4 is comprised of an initial character position determinator 41 that sets the position of the first character of a character string, a link angle calculator 42 that calculates an angle of a link, a character placement position calculator 43 that calculates the placement position of the character, a character-outside-link determinator 44 that determines whether or not the character is placed outside the link, a character placer 45 that sets the placement of the character, an overlap determinator 46 that determines whether the character overlaps another character which is placed previously, a first parameter updater (parameter updater) 47 that updates a parameter necessary for the placement of the character when the character exists on a link and does not overlap any other character, and a second parameter updater 48 that updates a parameter necessary for the placement of the character when the character is placed outside the link.

Next, as shown in FIG. 5, the evaluation function calculator 5 is comprised of a character gap function calculator 51 that calculates a function value showing the influence of the character gap between character strings on the readability of a character string, a road angle function calculator 52 that calculates a function value showing the influence of an angle of a road on the readability of the character string, and an evaluation function value calculator 53 that calculates an evaluation function value. Further, the character gap function calculator 51 is comprised of an initial character string determinator 54 that determines whether or not the character string is the first one, a first Gaussian function value calculator 55 that calculates a value of a Gaussian function, and a character gap function updater 56 that updates a function value showing the influence of the character gap between character strings on the readability of a character string. In addition, the road angle function calculator 52 is comprised of a second Gaussian function value calculator 57 that calculates a value of a Gaussian function, and a road angle function updater 58 that updates a function value showing the influence of an angle of a road on the readability of a character string.

Figure 6:
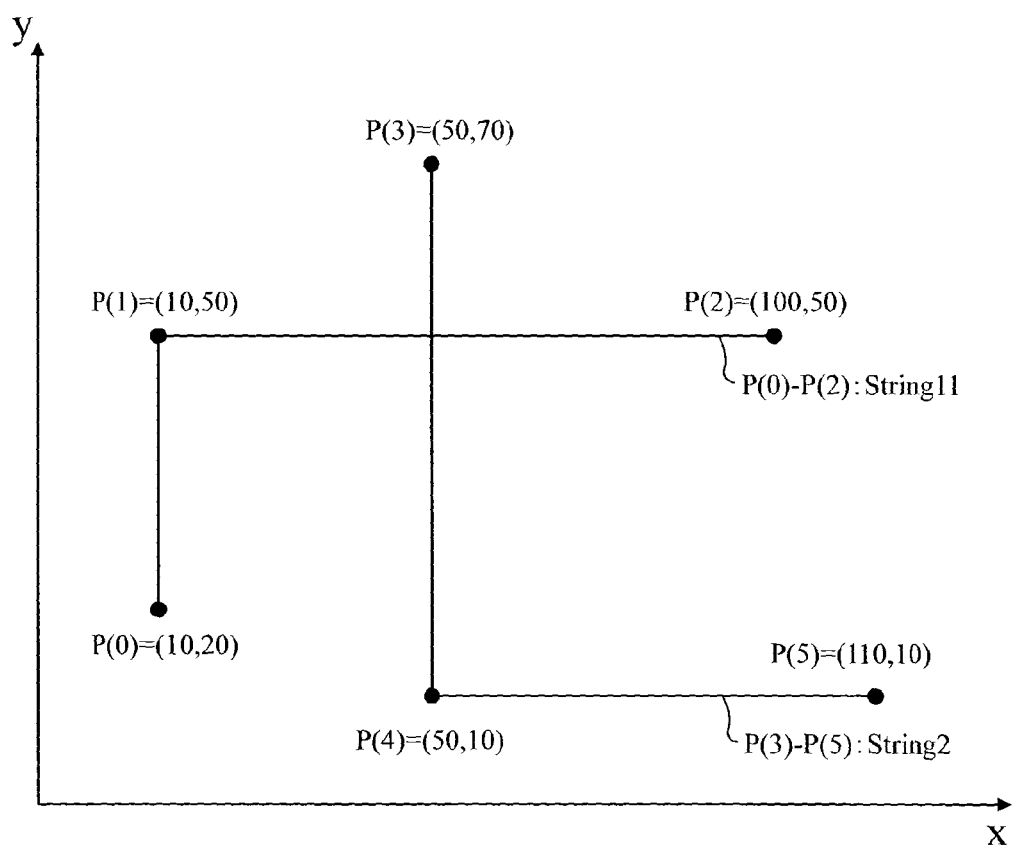
FIG. 6 is a diagram showing a relationship between two sets of road node series along each of which a character string is to be placed.

Next, the detailed operations of the candidate point generator 3, the character string placer 4, and the evaluation function calculator 5 will be explained. The following explanation of the operations will be made assuming that the character string data about character strings each of which is to be placed along a road node series are the data about a character string "String11" and a character string "String2," and the widths of the characters are all 5, and the heights of the characters are all 10. Further, a relationship between the road node series along which the character string "String11" is to be placed and the road node series along which the character string "String2" is to be placed is shown in FIG. 6. The road node series P(0) to P(2) along which the character string "String11" is to be placed consists of a node P(0)=(10, 20), a node P(1)=(10, 50), and a node P(2)=(100, 50). Similarly, the road node series P(3) to P(5) along which the character string "String2" is to be placed consists of a node P(3)=(50, 70), a node P(4)=(50, 10), and a node P(5)=(110, 10). In addition, STEP_SIZE is set to 1 and CANDIDATE_NUM (the number of candidate points) is set to 3, Σ is expressed by the following equation (2), H is expressed by the following equation (3), RC is set to 1, and SC is set to 1.

$$\Sigma = \begin{pmatrix} 1 & 0 \\ 0 & 1 \end{pmatrix} \quad (2)$$

$$H = \begin{pmatrix} 1 & 0 \\ 0 & 1 \end{pmatrix} \quad (3)$$

First, in step ST1 of the flow chart shown in FIG. 2, the character string data acquirer 2 acquires the first character string "String11," the second character string "String2," the road node series P(0) to P(2) and the road node series P(3) to P(5) along which the character strings are to be placed respectively, and the width and the height of each of the characters which form each of the character strings from the character string data storage 1. Next, the character string placement device optimizes the placement of the first character string "String11." As a method of optimizing the placement, the candidate point generator 3 generates candidate points whose number is equal to preset CANDIDATE_NUM on the road node series P(0) to P(2) along which the character string "String11" is to be placed, i.e., three candidate points at equal intervals.

Figure 7:
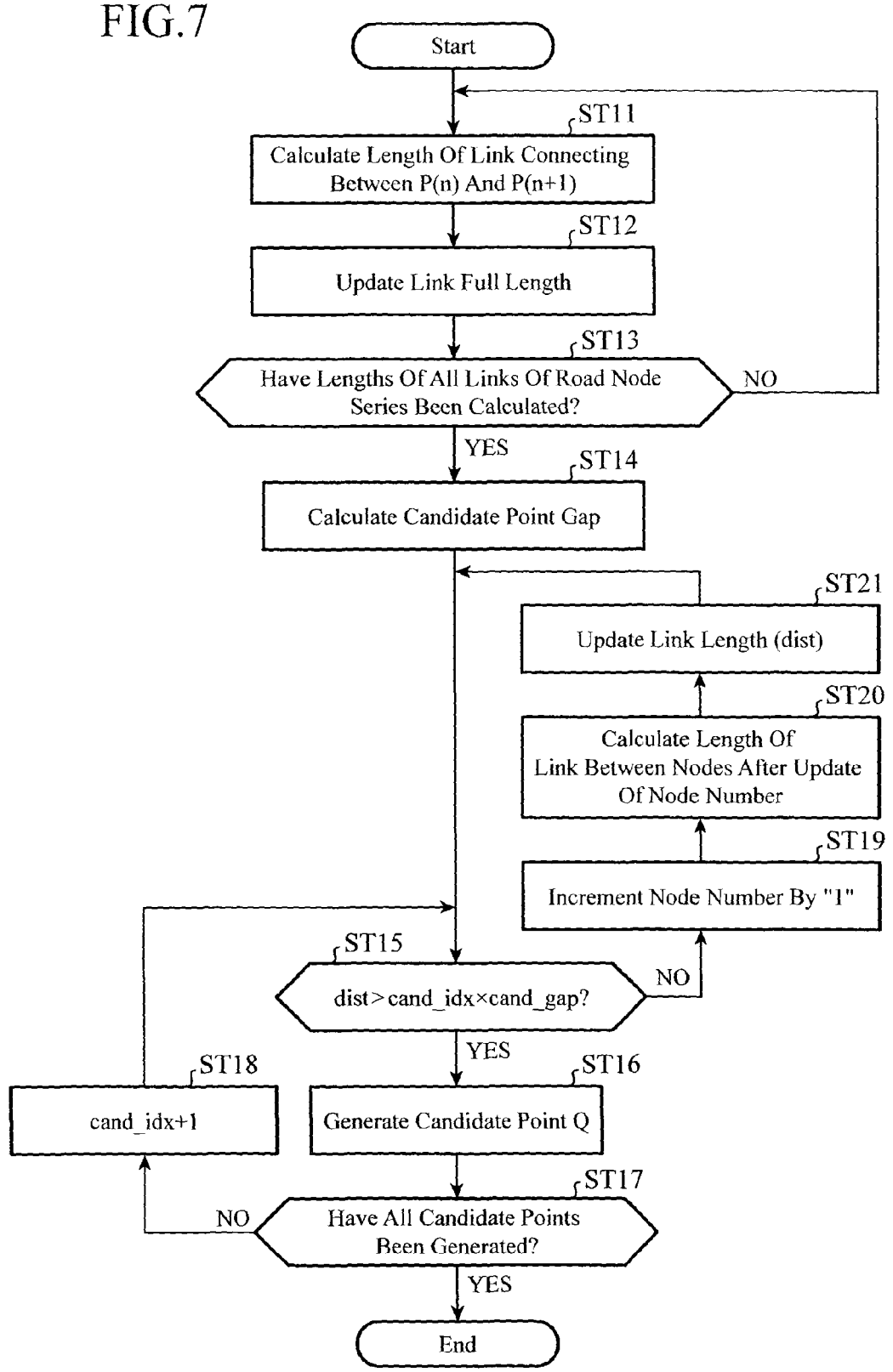
FIG. 7 is a flow chart showing the operation of the candidate point generator of the character string placement device in accordance with Embodiment 1.

A concrete method of generating candidate points will be explained with reference to a flow chart shown in FIG. 7. FIG. 7 is a flow chart showing the operation of the candidate point generator of the character string placement device in accordance with Embodiment 1. The first link length calculator 31 of the candidate point generator 3 refers to each node information stored in the information storage unit 37, and calculates the length of the link connecting between the n-th node P(n) and the (n+1)-th node P(n+1) (step ST11). After the first link length calculator 31 calculates the length of the link, the link full length updater 32 adds the length to a link full length which the first link length calculator has calculated the last time and updates the link full length (total_dist) (step ST12).

The first link length calculator 31 determines whether the first link length calculator has completed the calculation the lengths of all the links which form the road node series (step ST13). When the first link length calculator has not completed the calculation of the lengths of the links associated with all the nodes (when NO in step ST13), the character string placement device returns to the process of step ST11 and repeats the above-mentioned processes. In contrast, when the first link length calculator has completed the calculation of the lengths of the links associated with all the nodes (when YES in step ST13), the candidate point gap calculator 33 acquires the number of candidate points (CANDIDATE_NUM) with reference to the information storage 37, and calculates the gap between candidate points according to the following equation (4) and stores the candidate point gap (cand_gap) calculated thereby in the information storage 37 (step ST14).

$$cand\_gap = total\_dist / CANDIDATE\_NUM \quad (4)$$

Next, the generator 34 refers to the information storage 37 acquires the information about the candidate point gap (cand_gap), the candidate point number (cand_idx), and the link length (dist) of the link connecting between the leading node of the road node series and the predetermined node, and determines whether the candidate point satisfies a condition shown by the following equation (5) (step ST15).

$$dist > cand\_idx \times cand\_gap \quad (5)$$

An initial value of the candidate point number (cand_idx) is 0, and an initial link length (dist) is the length of the link connecting between the leading node of the road node series and the node placed next to the leading node. It is assumed that these initial conditions are stored in advance in the information storage 37.

When the condition shown in the above-mentioned equation (5) is satisfied (when YES in step ST15), the generator 34 generates a candidate point Q which is located along the road node series at a distance of the candidate point number (cand_idx) x the candidate point gap (cand_gap) from the leading node of the road node series (step ST16). After that, the generator 34 determines whether the generator has generated all candidate points Q whose number is CANDIDATE_NUM (step ST17). When the generator has generated all the candidate points (when YES in step ST17), the character string placement device ends the processing. In contrast, when the generator has not generated all the candidate points (when NO in step ST17), the character string placement device increments the candidate point number by one and stores the candidate point number in the information storage 37 (cand_idx+1 in step ST18), and returns to the process of step ST15.

In contrast, when the condition shown in the above-mentioned equation (5) is not satisfied (when NO in step ST15), the generator increments the node number in the determining process of step ST15 by one (step ST19), and calculates the length of the link connecting between the node of the incremented node number and the node placed next to the node of the incremented node number (step ST20). The distance updater 36 adds the length of the link which is newly calculated in step ST20 to the link length (dist) which is used for the determining process of step ST15, and updates the link length (dist) (step ST21). The pieces of information updated in steps ST19 to ST21 are stored in the information storage 37. After that, the flow chart returns to the process of step ST15.

Next, an explanation will be made by using the concrete example shown in FIG. 6 along with the flow chart shown in FIG. 7. In step ST11, the first link length calculator 31 calculates the length: 30 of the link connecting between the 0-th node P(0) and the first node P(1). In step ST12, the link full length updater 32 adds the length: 30 of the link to the link full length: 0 which is calculated the last time, and updates the link full length. The first link length calculator similarly calculates the length: 90 of the link connecting between the first node P(1) and the second node P(2), and updates the link full length to 120. When it is determined, in step ST13, that the lengths of all the links which form the road node series P(0) to P(2) are calculated, the candidate point gap calculator 33, in step ST14, acquires the number of candidate points (CANDIDATE_NUM)=3 with reference to the information storage 37, and calculates the candidate point gap (cand_gap): 120/3=40.

In step ST15, the generator 34 refers to the information storage unit 37 and acquires the candidate point gap (cand_gap): 40, the candidate point number (cand_idx): 0 (initial value), and the link length (dist): 30 (the initial link (P(0), P(1))), and determines whether the candidate point Q(0) satisfies the condition shown by the above-mentioned equation (5). In the example of FIG. 6, since 30>0×40, the generator determines that the candidate point satisfies the condition shown by the equation (5).

In step ST16, the generator 34 generates the candidate point Q(0) at a distance of 0×40=0 from the start node P(0). More specifically, the 0-th candidate point Q(0) is located at the same point as P(0). The position of the candidate point Q(0) is (10, 20), the index of the start node of the link (P(0), P(1)) on which the candidate point Q(0) is placed is 0, and the distance from the start node P(0) of the link on which the candidate point is placed to the candidate point is zero. In step ST17, the generator 34 determines that it has not generated all candidate points, and, in step 18, increments the candidate point number by one and shifts to generation of a candidate point Q(1), and returns to the process of step ST15.

Next, a generating process of generating the candidate point Q(1) will be explained. In step ST15, the generator 34 refers to the information storage unit 37 and acquires the candidate point gap (cand_gap): 40, the candidate point number (cand_idx): 1, and the link length (dist): 30 (the initial link (P(0), P(1))), and determines whether the candidate point Q(1) satisfies the condition shown by the above-mentioned equation (5). In the example of FIG. 6, since 30<1×40, the generator determines that the candidate point does not satisfy the condition shown by the equation (5). Then, in steps ST19 and 20, the generator adds 1 to the node number of the node P(0) and shifts to the node P(1), and calculates the length: 90 of the link connecting between the node P(1) and the node P(2). In step ST21, the distance updater 36 updates the link length (dist) to a value of 120 which the distance updater obtains by adding the link length: 90 calculated thereby to the link length (dist): 30 which is used for the determining process in above-mentioned step ST15. After storing the updated information in the information storage 37, the character string placement device returns to the process of step ST15.

In step ST15, the generator 34 refers to the information storage unit 37 and acquires the candidate point gap (cand_gap): 40, the candidate point number (cand_idx): 1, and the link length (dist): 120 (the link (P(0), P(2))), and determines whether the candidate point Q(1) satisfies the condition shown by the above-mentioned equation (5). In the example of FIG. 6, since 120>1×40, the generator determines that the candidate point satisfies the condition shown by the equation (5). In step ST16, the generator 34 generates the candidate point Q(1) at a distance of 1×40=40 from the start node P(0). After that, in step ST17, the generator 34 determines that it has not generated all candidate points, and, in step 18, increments the candidate point number by one and shifts to generation of a candidate point Q(2), and returns to the process of step ST15. The character string placement device repeatedly performs the above-mentioned processes until the character string placement generates the candidate point Q(2).

Figure 8:
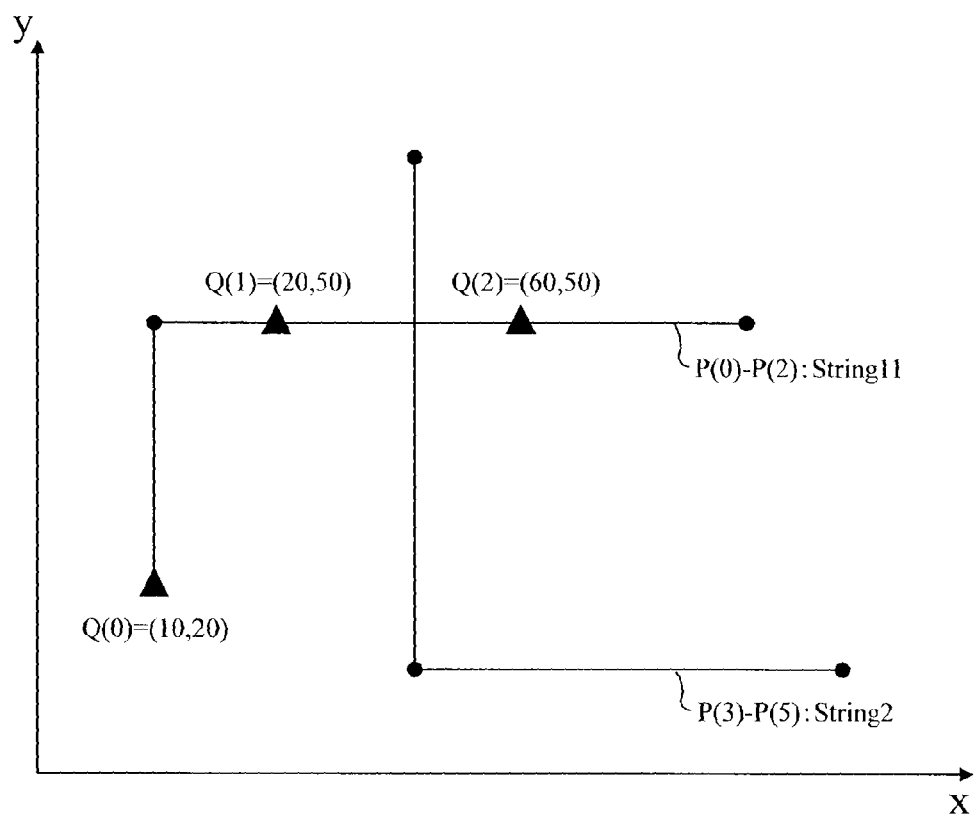
FIG. 8 is a diagram showing the results of generation of candidate points obtained by the character string placement device in accordance with Embodiment 1.

The results of generating the candidate points for the road node series P(0) to P(2) shown in FIG. 6 are shown in FIG. 8. Further, a positional relationship among the three candidate points Q(0), Q(1), and Q(2) shown in FIG. 8 is as shown below.

Candidate point Q(0) Position: (10, 20), Index of start node: 0, Distance from start node: 0

Candidate point Q(1) Position: (20, 50), Index of start node: 1, Distance from start node: 10

Candidate point Q(2) Position: (60, 50), Index of start node: 1, Distance from start node: 50

Figure 9:
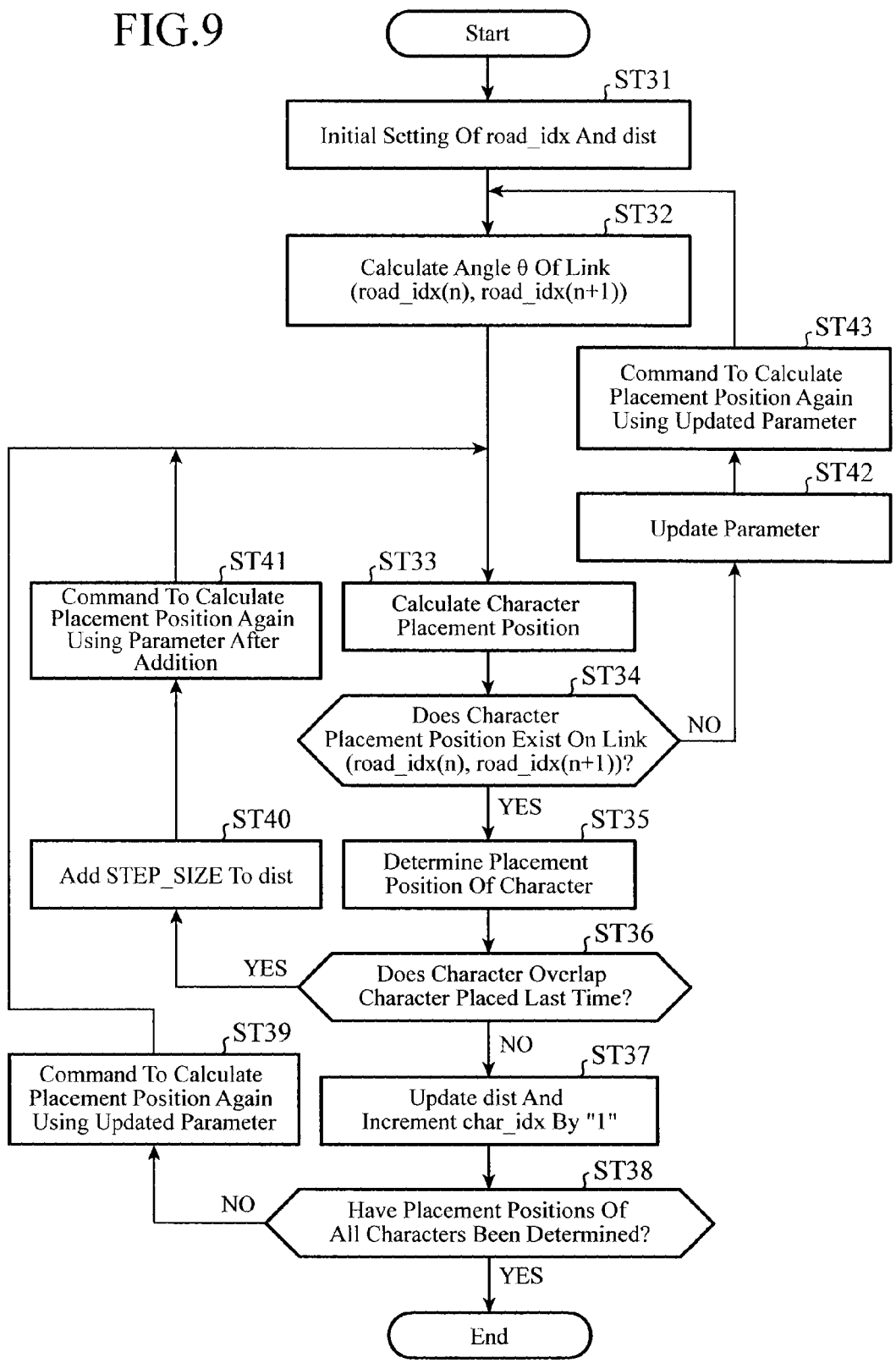
FIG. 9 is a flow chart showing the operation of the character string placer of the character string placement device in accordance with Embodiment 1.

Next, an operation of the character string placer 4 placing a character string at a candidate point Q generated by the candidate point generator 3 will be explained. FIG. 9 is a flow chart showing the operation of the character string placer of the character string placement device in accordance with Embodiment 1. Hereafter, the index of the start node of the link R(Q) on which the candidate point Q is placed is expressed as road_idx, and the distance from the leading node of the road node series along which the candidate point Q is placed to the candidate point Q is expressed as dist.

The initial character position determinator 41 carries out an initial setting of road_idx and dist at the time of starting its process (step ST31). Next, the link angle calculator 42 calculates an angle θ of the link connecting between the road_idx (n)-th node and the road_idx(n+1)-th node (step ST32). The angle θ of the link is defined as the angle of the link (road_idx (n), road_idx(n+1)), i.e., the angle of the vector (road_idx(n), road_idx(n+1)), where an X axis direction is defined as 0 degrees and a Y axis direction is defined as 90 degrees. The character placement position calculator 43 calculates a position at a distance of dist from the road_idx(n)-th node in a direction of θ as a character placement position (step ST33).

The character-outside-link determinator 44 determines whether the character placement position exists on the link (road_idx(n), road_idx(n+1)) (step ST34). When the character placement position exists on the link (road_idx(n), road_idx(n+1)) (when YES in step ST34), the character placer 45 determines the placement position of the character (step ST35). As a concrete process, the character placer sets the coordinates of the character string placement position which the character placement position calculator 43 calculates in step ST33 as left bottom coordinates of the character first. In addition, the character placer calculates left top coordinates, right bottom coordinates, and right top coordinates of the character according to the following equation (6).

$$
\begin{aligned}
LT(\text{char\_idx}) &= LD(\text{char\_idx}) + H(\text{char\_idx}) \begin{pmatrix} \cos(\theta + 90^\circ) \\ \sin(\theta + 90^\circ) \end{pmatrix}^T \\
RD(\text{char\_idx}) &= LD(\text{char\_idx}) + W(\text{char\_idx}) \begin{pmatrix} \cos\theta \\ \sin\theta \end{pmatrix}^T \\
RT(\text{char\_idx}) &= RD(\text{char\_idx}) + H(\text{char\_idx}) \begin{pmatrix} \cos(\theta + 90^\circ) \\ \sin(\theta + 90^\circ) \end{pmatrix}^T
\end{aligned} \quad (6)
$$

In the equation (6), char_idx is an index showing the placement order of each character which forms the character string. In addition, H(char_idx) shows the height of the char_idx-th character, W(char_idx) shows the width of the char_idx-th character, LD(char_idx) shows the left bottom coordinates of the char_idx-th character, LT(char_idx) shows the left top coordinates of the char_idx-th character, RD(char_idx) shows the right bottom coordinates of the char_idx-th character, and RT(char_idx) shows the right top coordinates of the char_idx-th character.

The overlap determinator 46 determines whether the placement position determined in step ST35 overlaps a character which is placed through a previous process (step ST36). When the placement position does not overlap any character (when NO in step ST36), the first parameter updater 47 adds the width of the char_idx-th character to dist and also increments char_idx by "1" (step ST37). After that, the first parameter updater 47 determines whether the character placer has determined the placement positions of all the characters which form the character string (step ST38). After the character placer has determined the placement positions of all the characters (when YES in step ST38), the character string ends the processing. In contrast, when the character placer has not determined the placement positions of all the characters yet (when NO in step ST38), the first parameter updater 47 commands the character placement position calculator 43 to calculate a placement position again on the basis of the parameter updated in step ST37 (step ST39). After that, the character string placement device returns to the process of step ST33 and repeats the above-mentioned processes.

In contrast, when the placement position overlaps a character (when YES in step ST36), the overlap determinator 46 adds STEP_SIZE to dist (step ST40), and commands the character placement position calculator 43 to calculate a placement position again on the basis of the parameter added in step ST40 (step ST41) After that, the character string placement device returns to the process of step ST33 and repeats the above-mentioned processes.

In addition, when the character placement position does not exist on the link (when NO in step ST34), the second parameter updater 48 updates the parameter (step ST42). Concretely, the second parameter updater 48 updates dist to a value which the second parameter updater obtains by subtracting the length of the link (road_idx (n), road_idx (n+1)) from dist, and, after incrementing road_idx by one, also commands the character placement position calculator 43 to calculate a placement position again on the basis of the updated parameter (step ST43). After that, the character string placement device returns to the process of step ST32 and repeats the above-mentioned processes.

Next, an explanation will be made by using the concrete example shown in FIGS. 6 and 8 along with the flow chart shown in FIG. 9. First, in step ST31, the initial character position determinator 41 carries out an initial setting of road_idx and dist to set the index: 0 showing the start node of the candidate point Q(0) to road_idx and also set the distance: 0 from the leading node P(0) of the road node series P(0) to P(2) to the candidate point Q to dist. In step ST32, the link angle calculator 42 calculates the angle θ of the link (P(0), P(1)) as 90 degrees. In step ST33, the character placement position calculator 43 calculates, as the character string placement position, the position LD(0)=(10, 20) at a distance of dist=0 from the road_idx=0-th node in a direction of θ=90 degrees.

Figure 10:
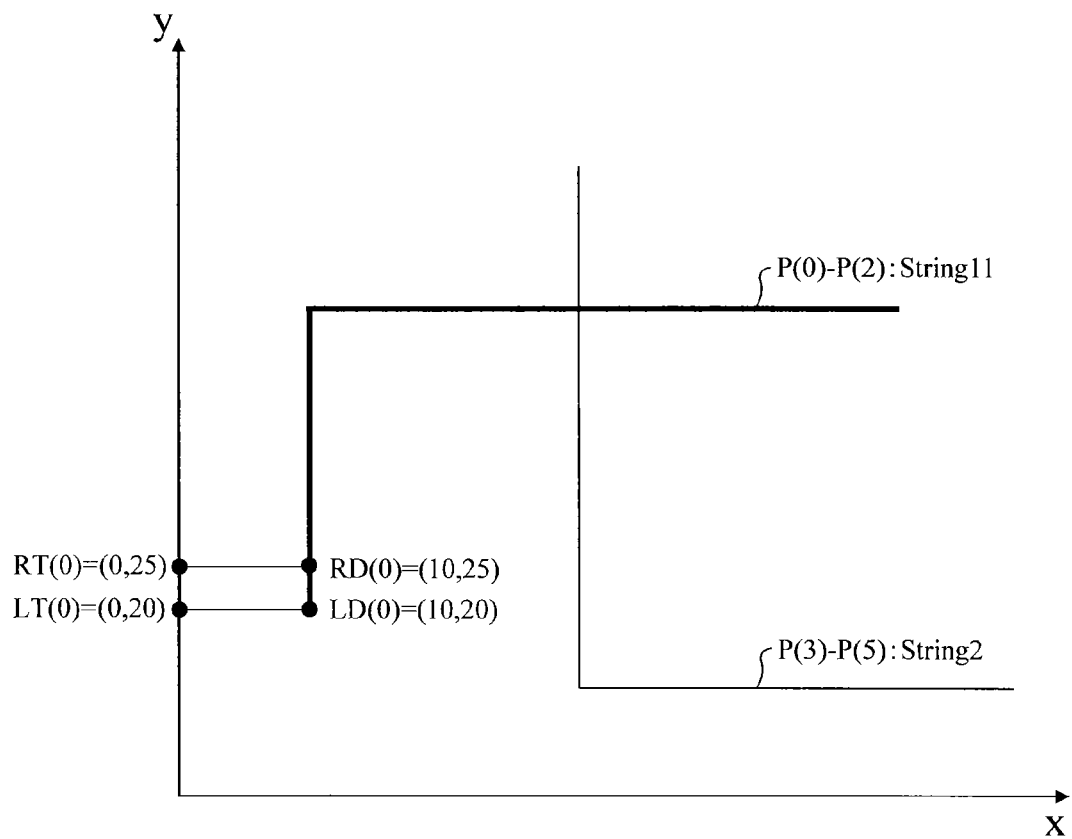
FIG. 10 is a diagram showing the result of placement by the character string placement device in accordance with Embodiment 1.

The character-outside-link determinator 44 determines that LD(0) exists on the link (P(0), P(1)) in the determining process of step ST34. In step ST35, the character placer 45 determines the placement position of the 0-th character "S" of the character string "String11." The character-outside-link determinator sets LD(0) as the left bottom coordinates of the character "S" first, and then sets LT(0)=(0, 20) as the left top coordinates of the character "S." After that, the character-outside-link determinator sets RD(0)=(10, 25) as the right bottom coordinates of the character "S." Finally, the character-outside-link determinator sets RT(0)=(0, 25) as the right top coordinates of the character "S." The placement of a circumscribed rectangle of the character "S" is shown in FIG. 10. In step ST36, the overlap determinator 46 determines whether or not there is an overlap between the character "S" which is placed in step ST35 and the character which is placed the last time. In this example, since no character which is placed the last time exists, the overlap determinator determines that there is no overlap.

In step ST37, the first parameter updater 47 adds the 0-th width "5" to dist and sets dist to dist=0+5=5, and adds "1" to char_idx and sets char_idx to char_idx=0+1=1. Because the first parameter updater 47, in step ST38, determines that the character placer has not determined the placement positions of all the characters which form the character string, the first parameter updater, in step ST39, commands the character placement position calculator 43 to calculate a placement position again on the basis of the updated parameter, and returns to the process of step ST33.

Figure 11:
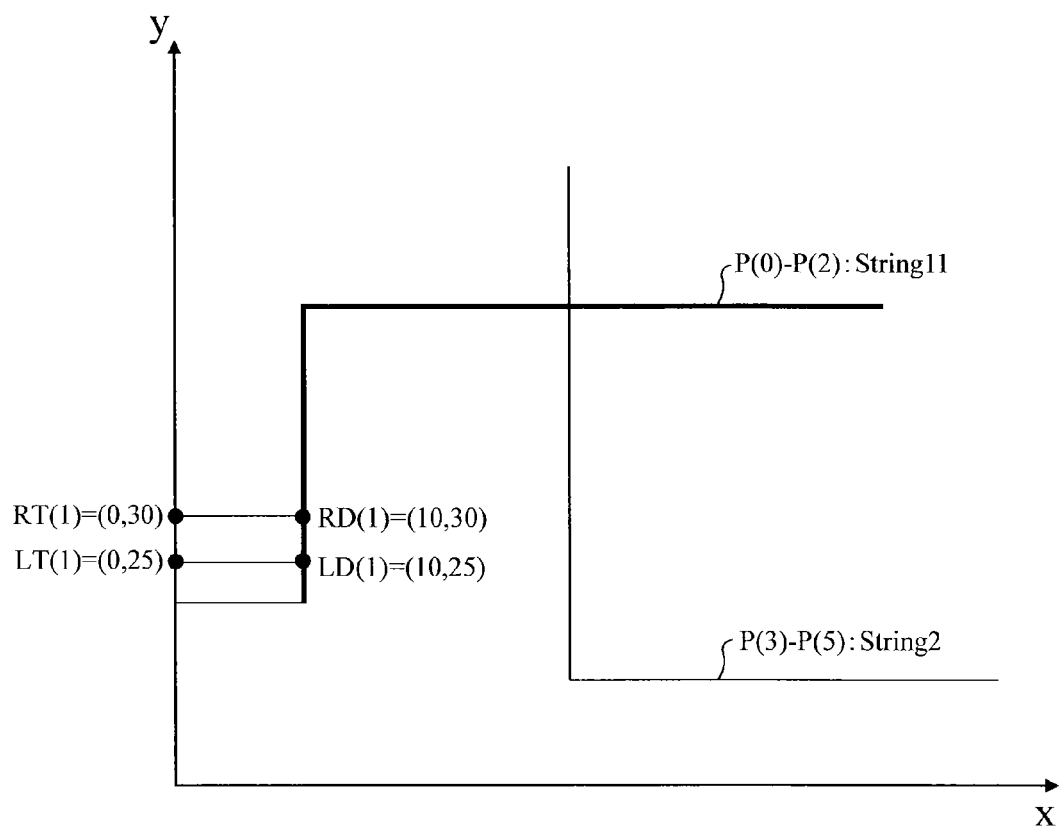
FIG. 11 is a diagram showing the result of placement by the character string placement device in accordance with Embodiment 1.

The character placement position calculator 43 which has received the command in step ST39 calculates the character placement position of the second character "t." The calculation is carried out on the basis of dist=5 and char_idx=1, which are updated in step ST37. In step ST33, the character placement position calculator 43 calculates the position LD(1)=(10, 25) as the character string placement position. The character string placement device carries out the processes of steps ST34 to ST36. As a result, it is determined that LD(1) exists on the link (P(0), P(1)), and the left bottom coordinates, the left top coordinates, the right bottom coordinates, and the right top coordinates of the second character "t" are LD (1)=(10, 25), LT(1)=(0, 25), RD(1)=(10, 30), and RT(1)=(0, 30) respectively. The placement of a circumscribed rectangle of the second character "t" is shown in FIG. 11. Because it is determined, in step ST36, that the character which is placed as the first character overlaps the character which is placed as the second character, the overlap determinator 46, in step ST40, adds STEP_SIZE=1 to dist, and, in step ST41, commands the character placement position calculator 43 to calculate the character placement position of the second character "t" again on the basis of the incremented parameter.

Figure 12:
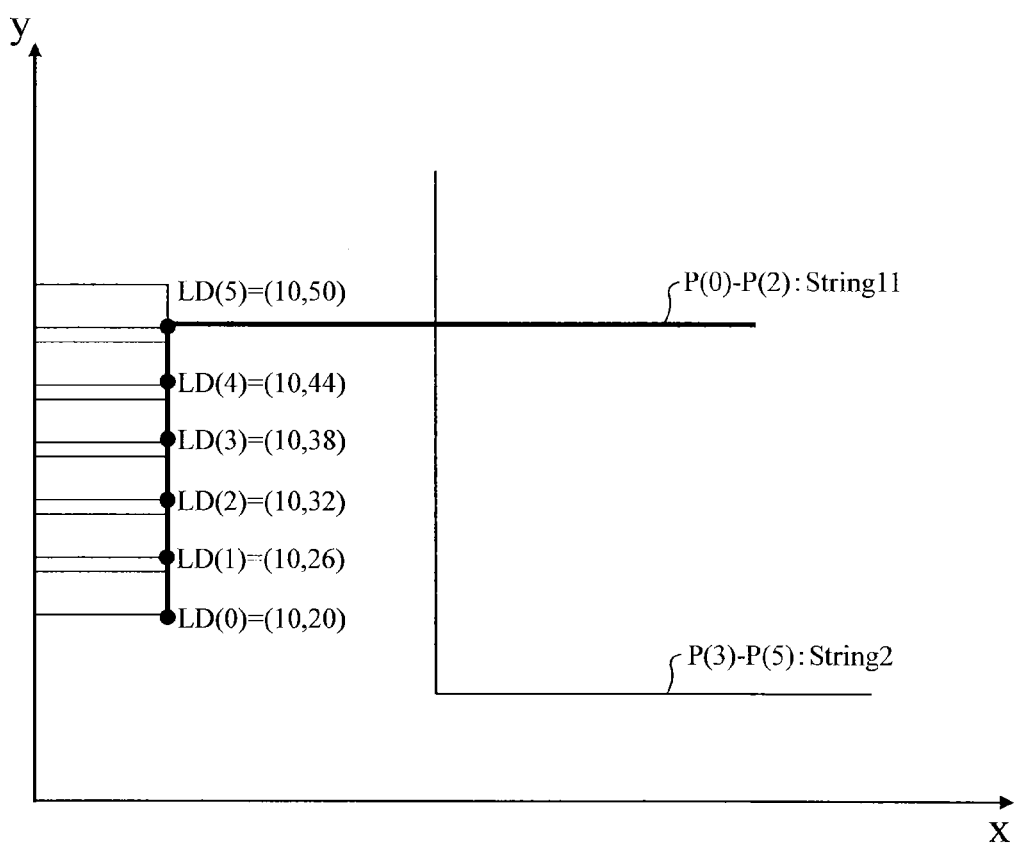
FIG. 12 is a diagram showing the result of placement by the character string placement device in accordance with Embodiment 1.

The character string placement device repeats the processes of steps ST33 to ST36 again, and calculates the character placement position of the second character "t." The calculation is carried out on the basis of dist=6, which is incremented in step ST40, and char_idx=1. The results of repeating the above-mentioned processes and placing the second character LD(1) through the sixth character LD(5) are shown in FIG. 12. Only the left bottom coordinates of each of the characters are shown in FIG. 12.

After placing the sixth character, the character placement position calculator 43 calculates the placement position of the seventh character "1" of the character string "String11." At this time, because dist=35, cand_idx=6, and road_idx=0, the position at a distance of dist from the road_idx-th node in a direction of θ is LD(6)=(10, 55). In step ST34, the character-outside-link determinator 44 determines that the placement position (10, 55) is outside the link (P(0), P(1)), and the second parameter updater 48, in step ST42, updates the parameter. Concretely, because the length of the link connecting between the 0-th node and the first node is "30", dist is updated to dist=35−30=5 and road_idx is set to road_idx=0+1=1. After that, the second parameter updater, in step ST43, issues a command for calculating the placement position again on the basis of the parameter updated by the second parameter updater 48, and returns to the process of step ST32.

Figure 13:
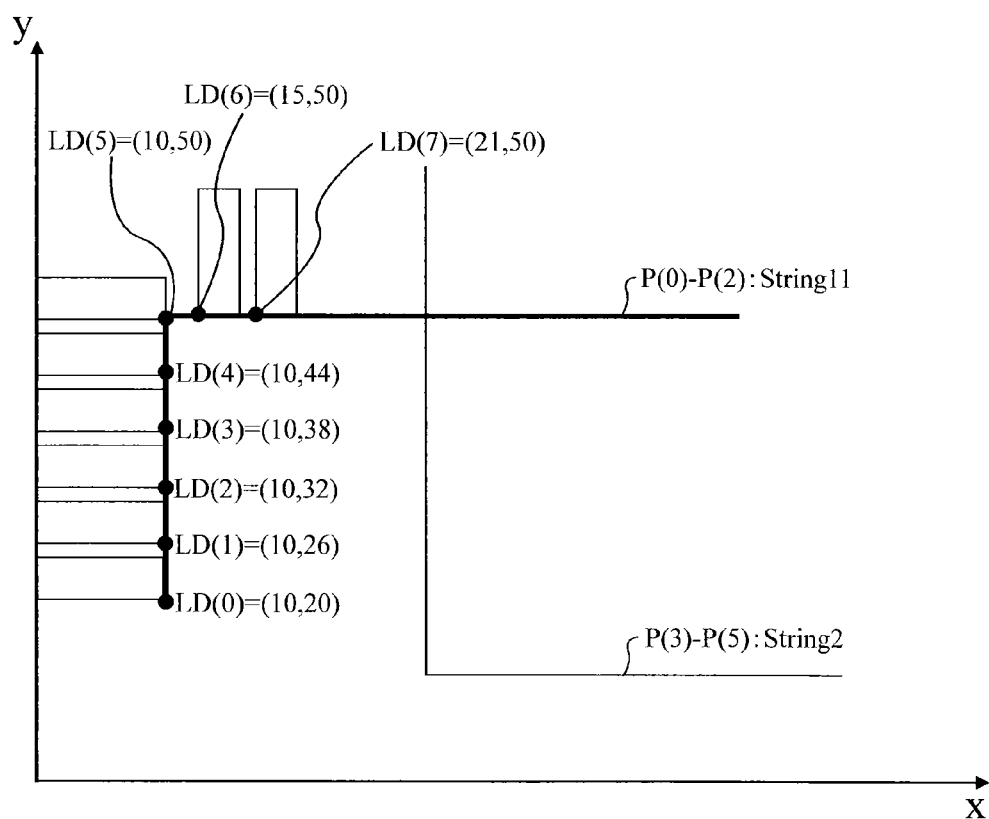
FIG. 13 is a diagram showing the result of placement by the character string placement device in accordance with Embodiment 1.

In step ST32, the link angle calculator 42 calculates the angle θ of the link (P(1), P(2)) as 0 degrees on the basis of the updated parameter. After that, the character string placement device carries out the same processes as those mentioned above to place the seventh character and the eighth character, and, when it is determined in the determining process of step ST38 that the placement positions of all the characters have been determined, ends the processing. The results of placing all the characters are shown in FIG. 13. Also in FIG. 13, only the left bottom coordinates of each of the characters are shown.

Figure 14:
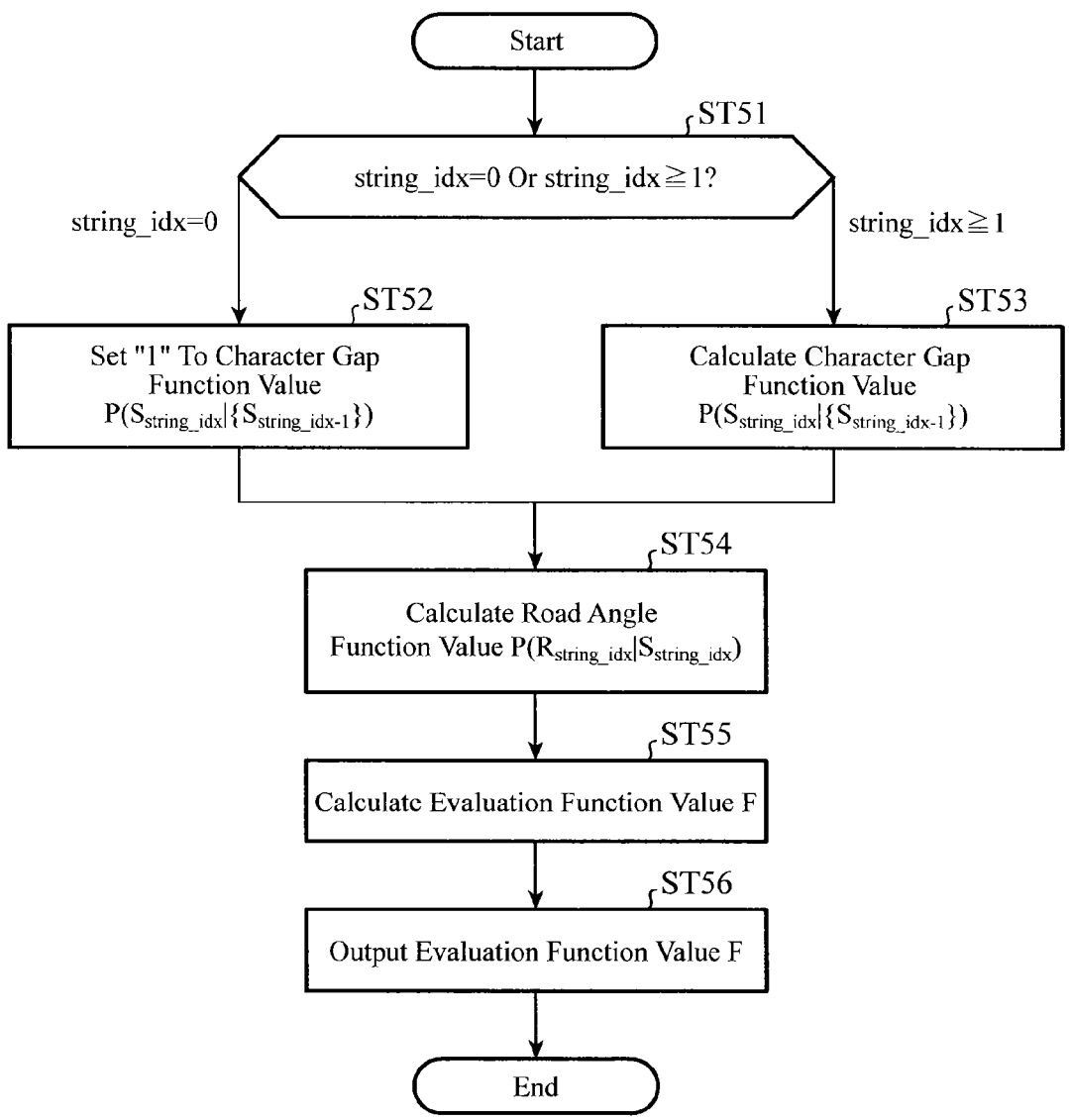
FIG. 14 is a flow chart showing the operation of the evaluation function calculator of the character string placement device in accordance with Embodiment 1.

Next, a method of calculating an evaluation function value showing the influence of a character string which is placed on the readability will be explained. FIG. 14 is a flow chart showing the operation of the evaluation function calculator of the character string placement device in accordance with Embodiment 1. First, the character gap function calculator 51 calculates a value $P(S_{string\_idx}|\{S_{string\_idx-1}\})$ of a character gap function which is a function showing the character gap between each character string (each of 0-th to (string_idx−1)-th character strings) whose placement is already determined and the string_idx(n)-th character string. Concretely, the initial character string determinator 54 of the character gap function calculator 51 determines whether either string_idx=0 or string_idx≥1 is established (step ST51). When it is determined, in step ST51, that string_idx=0 is established, the initial character string determinator sets "1" to the character gap function value $P(S_{string\_idx}|\{S_{string\_idx-1}\})$ (step ST52), and then advances to the process by the road angle function calculator 52.

In contrast, when it is determined, in step T51, that string_idx≥1 is established, the character gap function updater 56 calculates the character gap function value $P(S_{string\_idx}|\{S_{string\_idx-1}\})$ according to the following equation (7) (step ST53), and advances to the process by the road angle function calculator 52.

$$P(S_{string\_idx} | \{S_{string\_idx-1}\}) = \sum_{char\_idx=0}^{C_{string\_idx}} \sum_{string\_idx2=0}^{string\_idx-1} \sum_{char\_idx2=0}^{C_{string\_idx2}} N'(x_{char\_idx} | x_{char\_idx2}) \qquad (7)$$

In the above-mentioned equation (7), $C_{string\_idx}$ and $C_{string\_idx2}$ shows the number of characters of the string_idx-th character string and the number of characters of the string_idx2-th character string respectively. Further, $x_{char\_idx}$ and $x_{char\_idx2}$ in the equation (7) show the center coordinates of the char_idx-th character and the center coordinates of the char_idx2-th character respectively.

$N'(x_{char\_idx}|x_{char\_idx2})$ in the above-mentioned equation (7) is calculated by the first Gaussian function output unit 55 according to the following equation (8).

$$N'(x_{char\_idx} | x_{char\_idx2}) = SC \times \exp\left(-\frac{(x_{char\_idx} - x_{char\_idx2})^T H^{-1}(x_{char\_idx} - x_{char\_idx2})}{2}\right) \qquad (8)$$

$x_{char\_idx}$ and $x_{char\_idx2}$ in the above-mentioned equation (8) show the center coordinates of the char_idx-th character and the center coordinates of the char_idx2-th character respectively, SC shows a constant, and $H^{-1}$ shows a covariance matrix.

The road angle function updater 58 calculates a road angle function value $P(R_{string\_idx}|S_{string\_idx})$ according to the following equation (9) (step ST54).

$$P(R_{string\_idx} | S_{string\_idx}) = \sum_{char\_idx=0}^{C_{string\_idx}} \sum_{road\_idx=1}^{No_{string\_idx}-1} N(x_{char\_idx} | \mu_{road\_idx}) \quad (9)$$

$No_{string\_idx}$ in the above-mentioned equation (9) shows the number of nodes in the road node series along which the string_idx-th character string is to be placed, and $\mu_{road\_idx}$ shows the coordinates of the road_idx-th node in the road node series.

$N(x_{char\_idx}|\mu_{road\_idx})$ in the above-mentioned equation (9) is calculated by the second Gaussian function value calculator 57 according to the following equation (10).

$$N(x_{char\_idx} | \mu_{road\_idx}) = \text{Angle}(road\_idx) \times \quad (10)$$
$$\exp\left(-\frac{(x_{char\_idx} - \mu_{road\_idx})^T \sum^{-1}(x_{char\_idx} - \mu_{road\_idx})}{2}\right)$$

Figure 15:
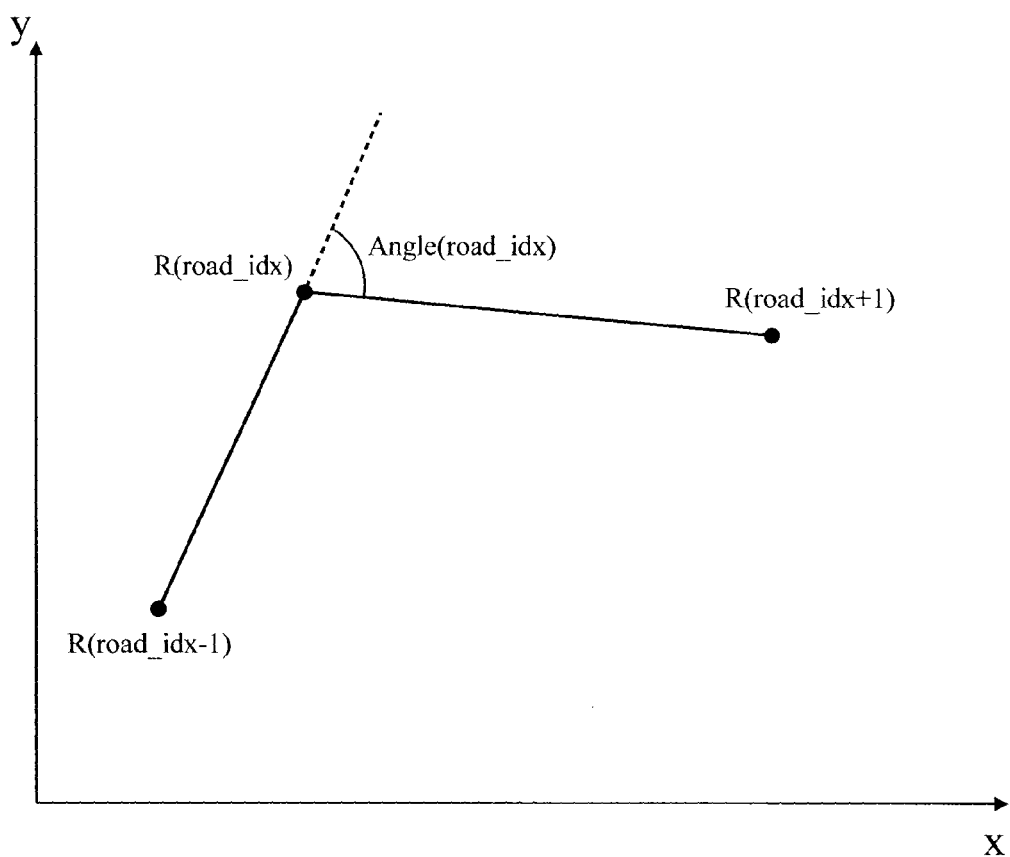
FIG. 15 is an explanatory drawing showing an example of calculation of a link angle by the character string placement device in accordance with Embodiment 1.

In the above-mentioned equation (10), $x_{char\_idx}$ and $\mu_{road\_idx}$ are vectors show position coordinates, $x_{char\_idx}$ shows the center of the char_idx-th character, and $\mu_{road\_idx}$ shows the road_idx-th road node. Further, T shows a transposition, and $\Sigma^{-1}$ shows the inverse matrix of $\Sigma$. Angle(road_idx) in the above-mentioned equation (10) shows an angle variation which the link connecting between the (road_idx−1)-th node and the road_idx-th node forms with the link connecting between the (road_idx+1)-th node and the road_idx-th node. An example of the calculation of Angle(road_idx) is shown in FIG. 15. R(road_idx) in FIG. 15 shows the road_idx-th road node. As shown in FIG. 15, an angle variation which two links form with each other is defined as a variation in the angles of the links.

The evaluation function value calculator 53 calculates the evaluation function value F by using the character gap function value $P(S_{string\_idx}|\{S_{string\_idx-1}\})$ calculated in step ST52 or ST53 and the road angle function value $P(R_{string\_idx}|S_{string\_idx})$ calculated in step ST54 according to the following equation (11) (step ST55).

$$F = \log P(R_{string\_idx}|S_{string\_idx}) + \log P(S_{string\_idx}|\{S_{string\_idx-1}\}) \quad (11)$$

The calculated evaluation function value F is outputted to the minimum evaluation function value storer 6 (step ST56), and the character string placement device ends the processing.

Next, an explanation will be made by using the concrete example shown in FIG. 13 along with the flow chart shown in FIG. 14. In step ST51, the initial character string determinator 54 determines whether either string_idx=0 or string_idx≥1 is established. First, since the determination is the first one, string_idx=0 is established at this time, and the initial character string determinator sets, in step ST52, sets "1" to the character gap function value $P(S_{string\_idx}|\{S_{string\_idx-1}\})$.

Next, the road angle function updater 58, in step ST54, calculates the value of $P(R_{string\_idx}|S_{string\_idx})$ as $2.36036 \times 10^{-85}$ according to the above-mentioned equation (9). After that, the road angle function updater 58 updates char_idx and road_idx to repeat the process of step ST54, and finally acquires the value of $P(R_{string\_idx}|S_{string\_idx})$=0.000777442.

In step ST55, the evaluation function value calculator 53 calculates the evaluation function value on the basis of the character gap function value $P(S_{string\_idx}|\{S_{string\_idx-1}\})$=1 which is calculated in step ST52, and the road angle function value $P(R_{string\_idx}|S_{string\_idx})$=0.000777442 which is finally acquired in step ST54 according to the above-mentioned equation (11), and acquires the evaluation function value F=log 0.000777442+log 1=−3.109331764. In step ST56, the evaluation function value calculator outputs the evaluation function value F calculated thereby to the minimum evaluation function value storer 6. The minimum evaluation function value storer 6 determines that the calculated evaluation function value F is less than min_cost and then sets F=−3.109331764 to the value of min_cost and stores this value in the minimum evaluation function value data storage 7, and also sets Q(0) to the character string start point of the 0-th character string and stores this character string start point in the character string placement start point data storage 9. The minimum evaluation function value storer further stores the character string placement shown in FIG. 13 in the character string placement data storage 8, and the character string placement device ends the processing.

Figure 16:
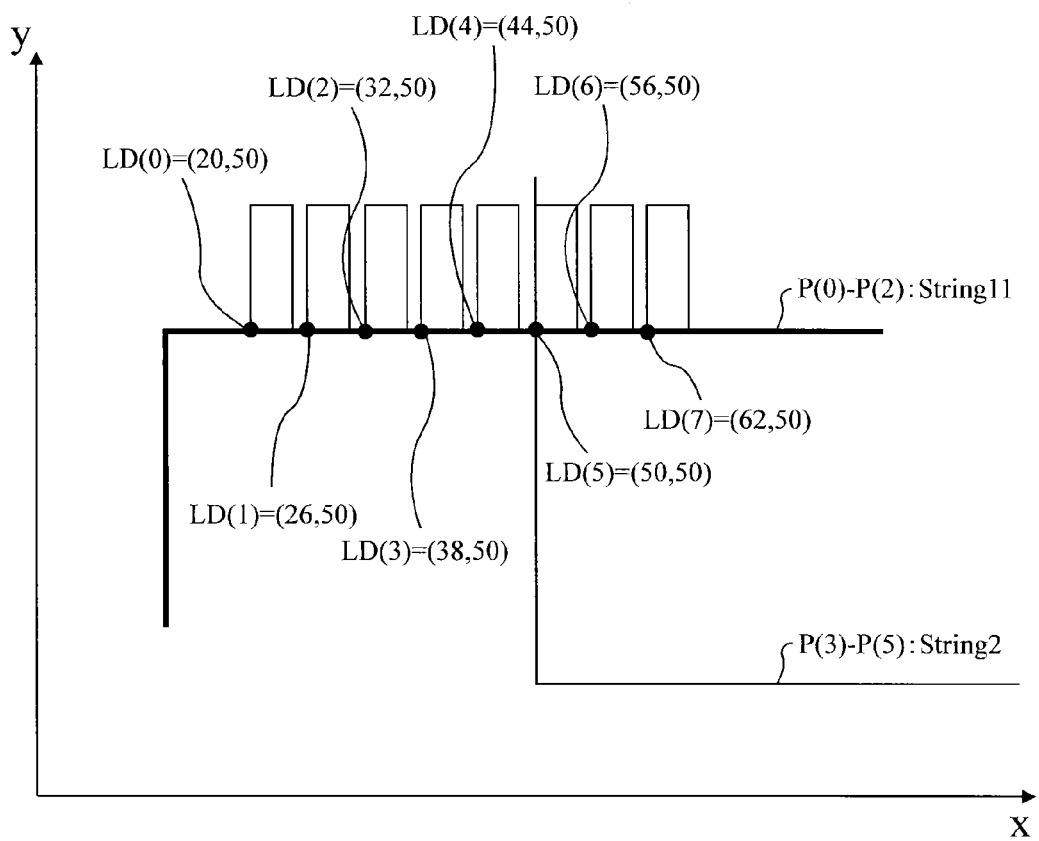
FIG. 16 is a diagram showing an example of placement by the character string placement device in accordance with Embodiment 1.

After that, the character string placement device repeats the above-mentioned processes, and the character string placer 4 places the 0-th character string from the first candidate point Q(1). An example of the placement in this case is shown in FIG. 16. The evaluation function value calculator 53 calculates the evaluation function value F for the example of the placement shown in FIG. 16. In this example, the evaluation function value F is −19.48284883 and is outputted to the minimum evaluation function value storer 6. Because the evaluation function value F is less than mini_cost, the minimum evaluation function value storer 6 updates the value of mini_cost to −19.48284883 and sets Q(1) to the character string start point, and stores the character string placement shown in FIG. 16 in the character string data storage 7, and the character string placement device ends the processing.

Figure 17:
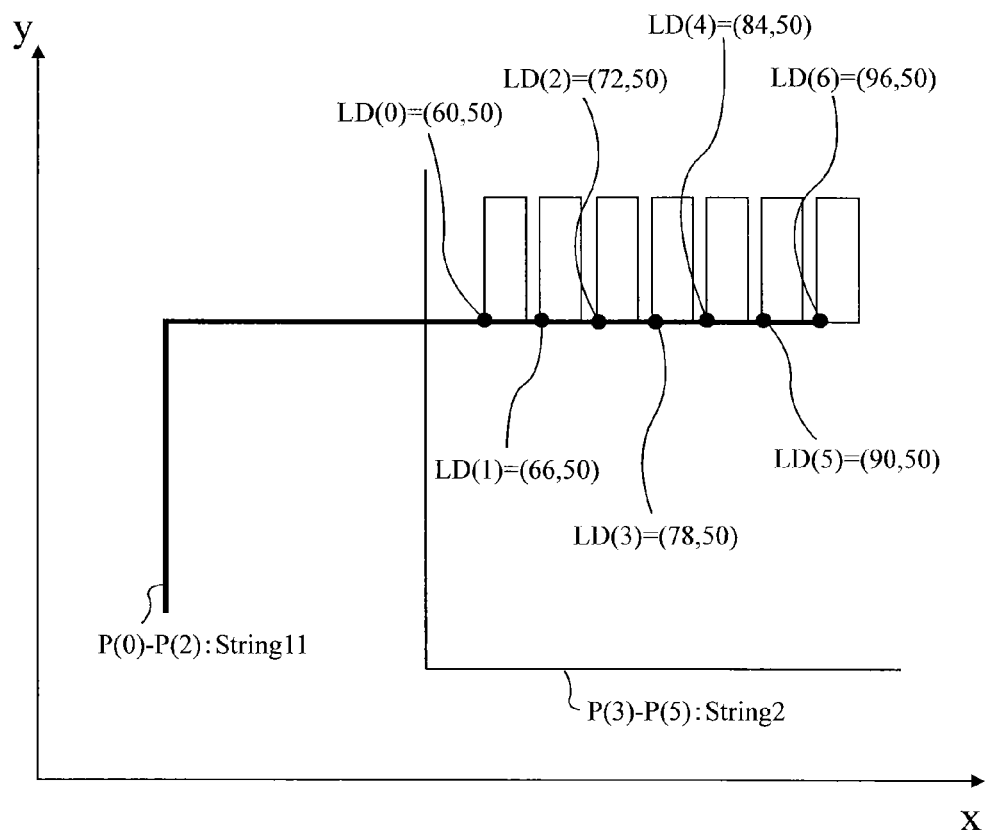
FIG. 17 is a diagram showing an example of placement by the character string placement device in accordance with Embodiment 1.

The character string placement device further repeats the same processes, and places the character string from the second candidate point Q(2). In this case, up to the seventh character is placed as shown in FIG. 17. After that, the character placement position calculator 43 of the character string placer 4 calculates the placement position of the eighth character. At this time, dist=101 and road_idx=1. Therefore, the character placement position calculator calculates a position LD(7) at a distance of dist from the road_idx-th node P(1) along the link connecting between the road_idx-th node and the (road_idx+1)-th node. LD(7)=(101, 50) is obtained as the result of the calculation.

After that, the character-outside-link determinator 44 determines whether or not LD(7) is located outside the link. Because LD(7) is located outside the link, the second parameter updater 48 updates dist. In this case, dist is updated to dist=1. After that, because no link along which the eighth character is to be placed exists, the character string placement device ends the processing. More specifically, because it is impossible to place the character string "String11" from the candidate point Q(2), the calculation using the evaluation function is not carried out. The character string placement start point of the 0-th character string is determined in this way. In this case, the character string placement start point of the 0-th character string which is the character string "String11" is set to Q(1). Further, the character string placement (refer to FIG. 16) to place the character string from Q(1) along the road node series is used for optimization of the character string placement start points of the first and subsequent character strings.

Figure 18:
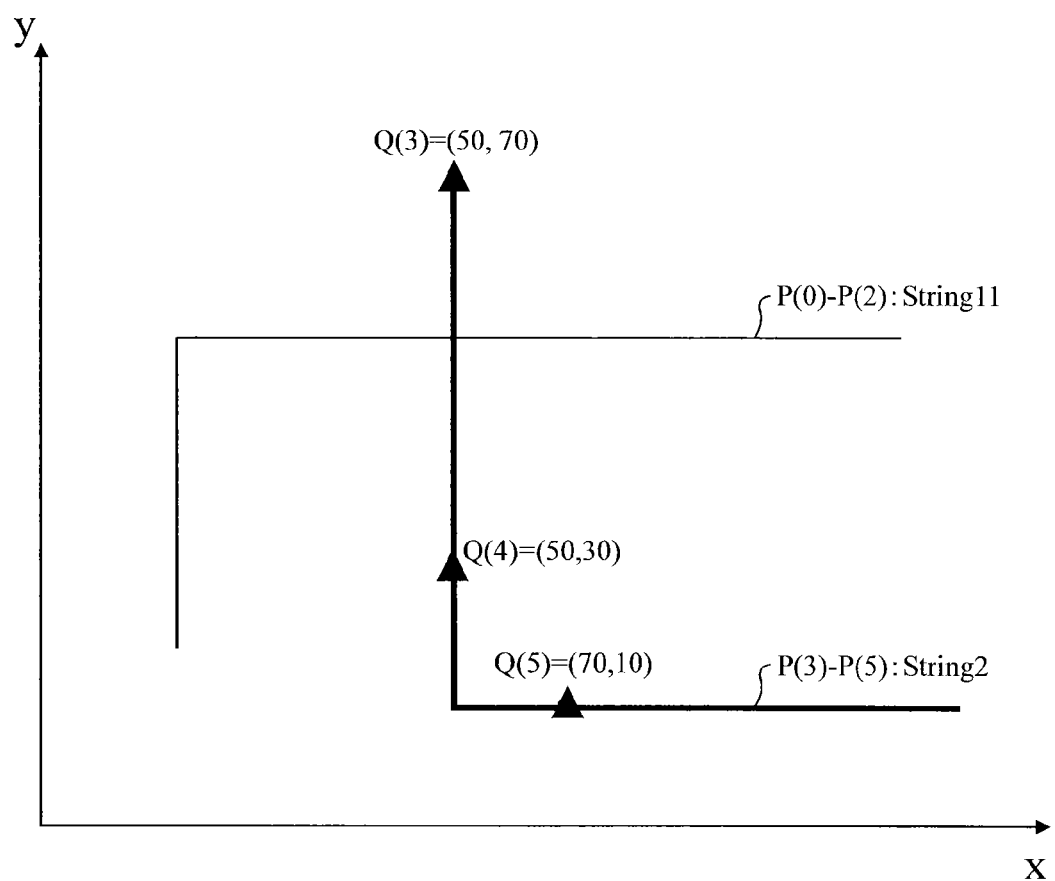
FIG. 18 is a diagram showing the results of generation of candidate points by the character string placement device in accordance with Embodiment 1.
Figure 19:
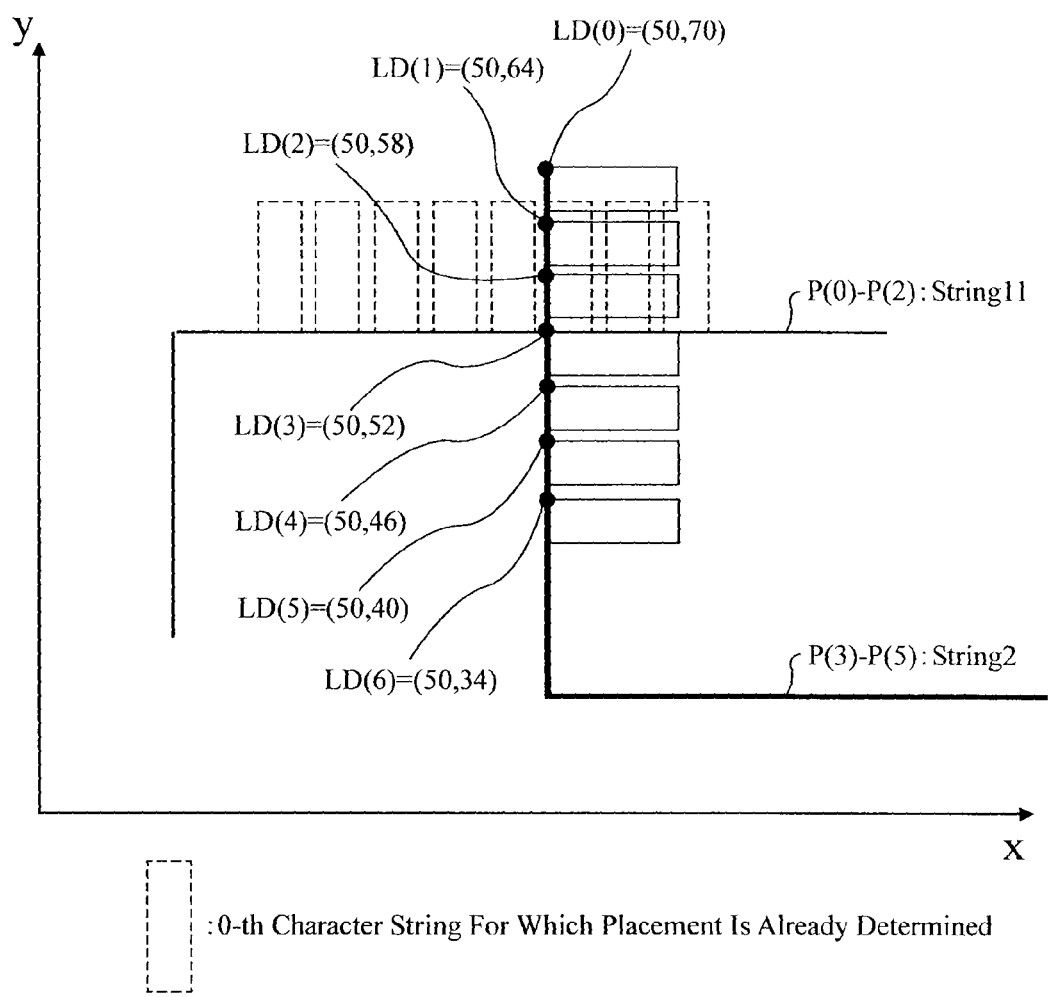
FIG. 19 is a diagram showing an example of placement by the character string placement device in accordance with Embodiment 1.

After determining the character string placement point of the 0-th character string "String11," the character string placement device then carries out the same processes also on "String2" which is the first character string. First, the candidate point generator 3 generates candidate points on the road link along which the first character string is to be placed. In this case, as shown in FIG. 18, three candidate points Q(3), Q(4), and Q (5) are generated. Next, the character string placer 4 places the first character string from the candidate point Q(3) (refer to FIG. 19). After that, the evaluation function calculator 5 calculates the evaluation function value F.

Concretely, the initial character string determinator 54, in step ST51, determines that string_idx=1 is established, and the character gap function updater 56, in step ST53, calculates the value of the character gap function value $P(S_{string\_idx}|\{S_{string\_idx-1}\})$ as $5.1\times10^{-264}$ according to the above-mentioned equation (7). After that, the character string placement device repeats the process by the character gap function updater 56 to update the character gap function value $P(S_{string\_idx}|\{S_{string\_idx-1}\})$, and finally acquires the value of $P(S_{string\_idx}|\{S_{string\_idx-1}\})=0.040705$.

Next, the road angle function updater 58, in step ST54, calculates the value of $P(R_{string\_idx}|S_{string\_idx})$ as $1.96618\times10^{-53}$. In step ST55, the evaluation function value calculator 53 calculates the evaluation function value F on the basis of the character gap function value $P(S_{string\_idx}|\{S_{string\_idx-1}\})=0.040705$ and the road angle function value $P(R_{string\_idx}|S_{string\_idx})=1.96618\times10^{-53}$ according to the above-mentioned equation (11). In this case, the evaluation function value F is F=log $1.96618\times10^{-53}$+log $0.040705$=−52.7063767−1.3936=−54.0999767. In step ST56, the evaluation function value calculator outputs the evaluation function value F calculated thereby to the minimum evaluation function value storer 6.

After that, the minimum evaluation function value storer 6 determines that the calculated evaluation function value F is less than min_cost, and sets min_cost to min_cost=−54.0999767 and stores this value in the minimum evaluation function value data storage 7. The minimum evaluation function value storer also sets the character string placement start point of the first character string to Q(3) and stores this character string placement start point in the character string placement start point data storage 9, and further stores the character string placement shown in FIG. 19 in the character string placement data storage 8.

Figure 20:
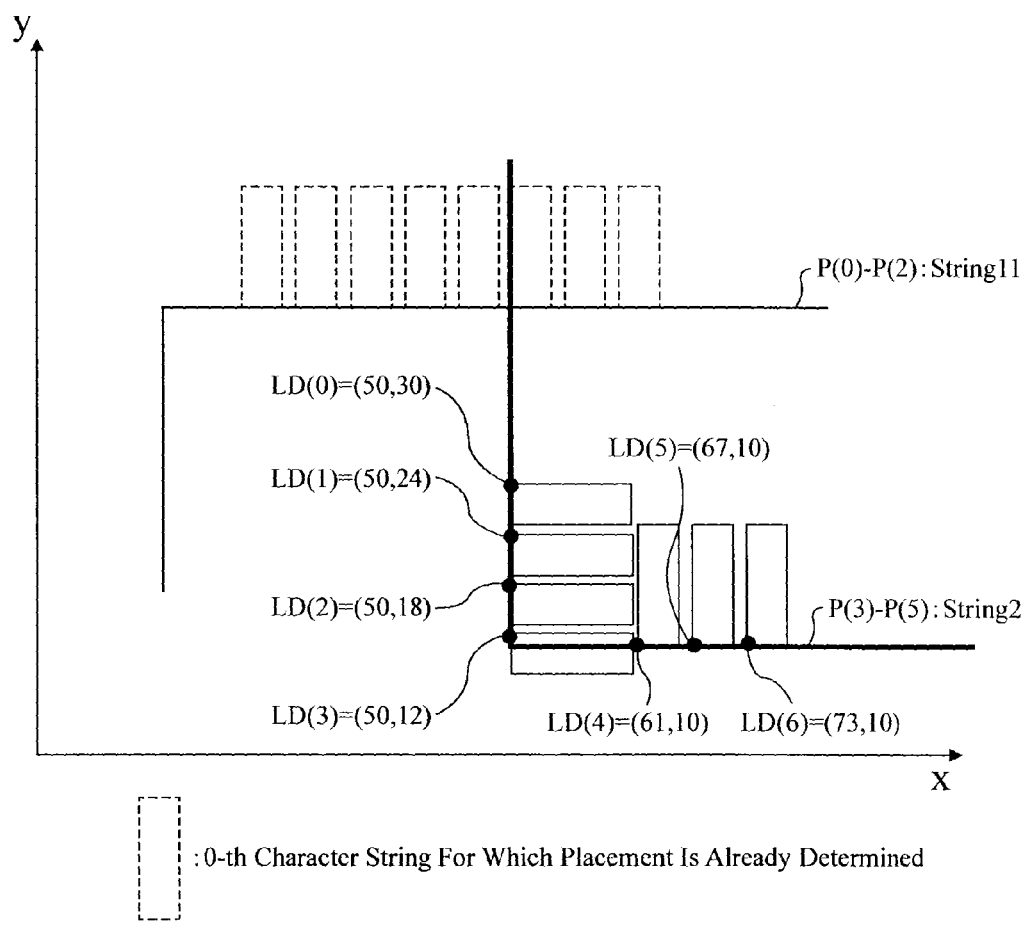
FIG. 20 is a diagram showing an example of placement by the character string placement device in accordance with Embodiment 1.
Figure 21:
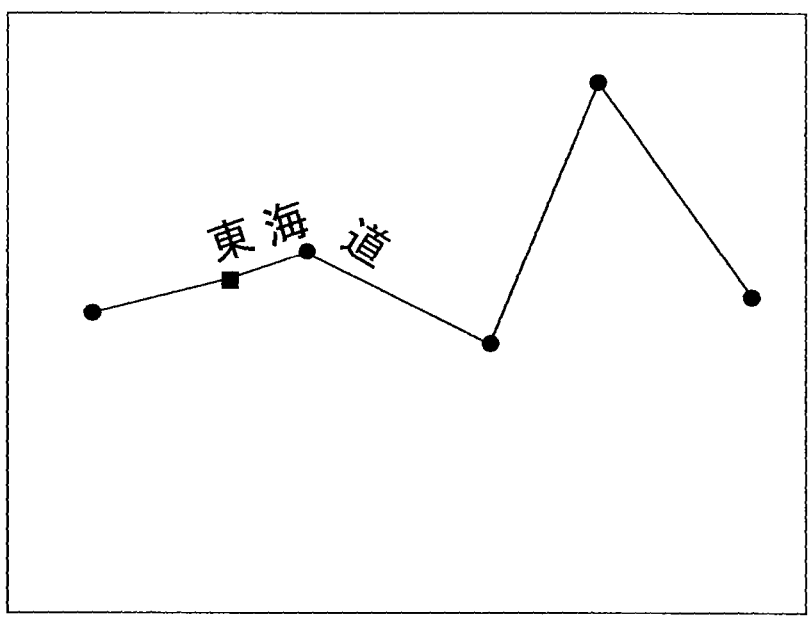
FIG. 21 is an explanatory drawing showing conventional placement of a character string.
Figure 22:
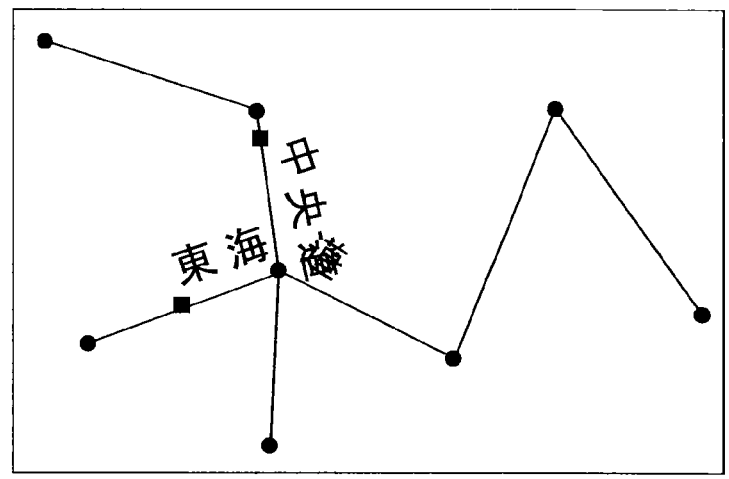
FIG. 22 is an explanatory drawing showing conventional placement of character strings.
Figure 22:
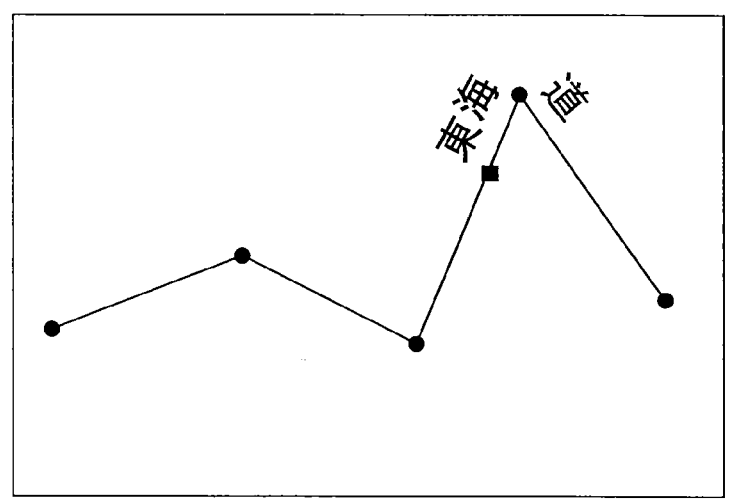
Figure 22:
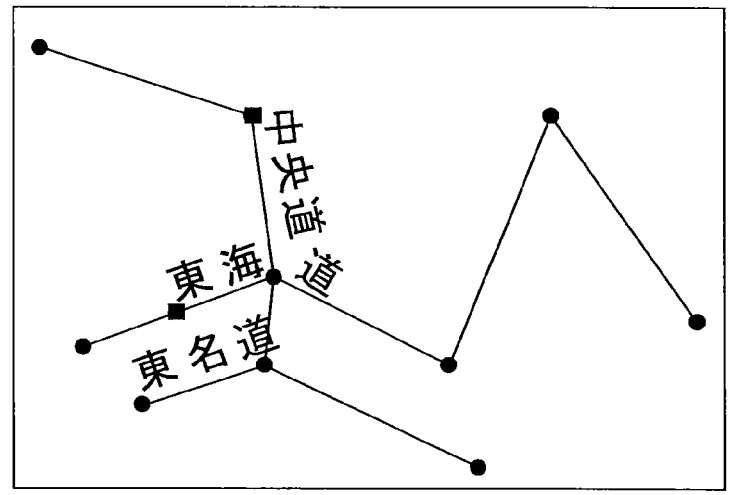
Figure 23:
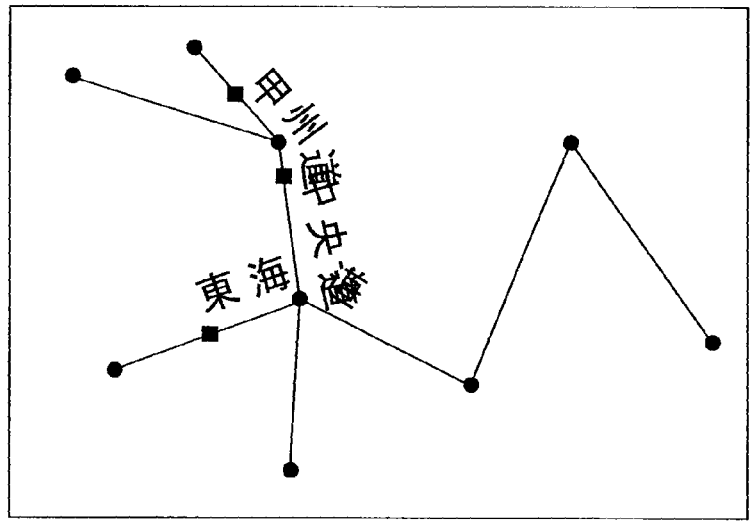
FIG. 23 is an explanatory drawing showing an improvement in the readability of conventional placement of character strings.
Figure 23:
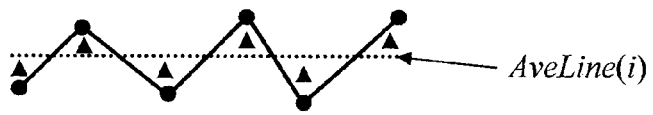

After that, the character string placer 4 similarly places the first character string "String2" from the candidate point Q(4) (refer to FIG. 20). The character gap function calculator 51 calculates the character gap function value $P(S_{string\_idx}|\{S_{string\_idx-1}\})=2.7947\times10^{-166}$. After that, the road angle function calculator 52 calculates the road angle function value $P(R_{string\_idx}|S_{string\_idx})=0.002850205$. The evaluation function value calculator 53 calculates the evaluation function value F by using these values according to the above-mentioned equation (11). In this case, the evaluation function value F is F=log $2.7947\times10^{-166}$+log $0.002850205$=−165.55367−2.244093909=−167.7977639. The minimum evaluation function value storer 6 determines that the calculated evaluation function value F is less than min_cost, and sets min_cost to min_cost=−167.7977639 and also sets the character string placement start point of the first character string to Q(4).

Similarly, the character string placer 4 places the character string from Q(5). In this case, because in the placement of the character string from Q(5), the length of the road link is not sufficient and hence the character string cannot be placed properly, the character string placer determines that the character string placement has failed, and the character string placement device ends the processing. Through the above-mentioned processes, the character string placement start point of the first character string which is the character string "String2" is determined as Q(4).

As mentioned above, because the character string placement device in accordance with this Embodiment 1 is constructed in such a way that the character gap function calculator 51 that calculates a function value showing the influence of the character gap between character strings on the readability of each of the character strings is disposed in the evaluation function calculator 5, the character string placement device can set the character string placement start point of each of the character strings to an optimal position in such a way that the gap between character strings becomes large, in addition to taking into consideration an overlap between character strings and a variation in the angle of a road along which each of the character string is to be placed. As a result, the gap between character strings can be made to become wide, the degree of closeness between character strings can be prevented from becoming high, and the visibility of each of the character strings can be improved.

Further, because the character string placement device in accordance with this Embodiment 1 is constructed in such a way as to include the first Gaussian function value calculator 55 that calculates a Gaussian function value when calculating the character gap function value, a Gaussian distribution can be placed at the middle point between a road node and a character which is already placed, and the character string placement start point can be changed to an optimal position in such a way that the gap between character strings becomes wide.

While the invention has been described in its preferred embodiment, it is to be understood that various changes can be made in an arbitrary component in accordance with the embodiment, and an arbitrary component in accordance with the embodiment can be omitted within the scope of the invention.

INDUSTRIAL APPLICABILITY

The character string placement device in accordance with the present invention can be used for an improvement in the visibility of a display device or the like, and can also be utilized for application to a navigation device which provides an improved user visibility, and so on.

EXPLANATIONS OF REFERENCE NUMERALS

1 character string data storage, 2 character string data acquirer, 3 candidate point generator, 4 character string placer, 5 evaluation function calculator, 6 minimum evaluation function value storer, 7 minimum evaluation function value data storage, 8 character string placement data storage, 9 character string placement start point data storage, 31 first link length calculator, 32 link full length updater, 33 candidate point gap calculator, 34 generator, 35 second link length calculator, 36 distance updater, 37 information storage, 41 initial character position determinator, 42 link angle calculator, 43 character placement position calculator, 44 character-outside-link determinator, 45 character placer, 46 overlap determinator, 47 first parameter updater, 48 second parameter updater, 51 character gap function calculator, 52 road angle function calculator, 53 evaluation function value calculator, 54 initial character string determinator, 55 first Gaussian function value calculator, 56 character gap function updater, 57 second Gaussian function value calculator, 58 road angle function updater, 100 character string placement device.

The invention claimed is:

1. A character string placement device comprising:
an evaluation function calculator that calculates a plurality of evaluation function values, each of which shows an evaluation of placement of a character string placed at each of a plurality of candidate points on a node series; and
a minimum evaluation function value storer that determines at which of said plurality of candidate points to place the character string on a basis of comparison between said plurality of evaluation function values calculated by said evaluation function calculator;
wherein said evaluation function calculator includes:
a character gap function calculator that calculates a character gap function value for evaluating a distance between the character string placed at each of said plurality of candidate points and another character string placed at another node series, which is different from the node series on which said plurality of candidate points are placed;
an angle function calculator that calculates an angle function value showing an evaluation of an angle of the node series along which the character string is placed at each of said plurality of candidate points; and
an evaluation function value calculator that calculates said evaluation function value of the character string placed at each of said plurality of candidate points based on $F = \log P(R_{string\_idx}|S_{string\_idx}) + \log P(S_{string\_idx}|\{S_{string\_idx-1}\})$, wherein F is said evaluation function value, $P(R_{string\_idx}|S_{string\_idx})$ is said angle function value, and $P(S_{string\_idx}|\{S_{string\_idx-1}\})$ is said character gap function value.

2. The character string placement device according claim 1, further comprising:
a data acquirer that acquires character string data about said character string, and node series data about said node series;
a candidate point generator that generates said plurality of candidate points on said node series on a basis of said character string data and said node series data; and
a character string placer that places said character string at each of said plurality of candidate points,
wherein said minimum evaluation function value storer stores said evaluation function value less than a minimum evaluation function value as said minimum evaluation function value, and also stores character string placement and a character string placement start point in said minimum evaluation function value.

3. The character string placement device according to claim 2, wherein said candidate point generator includes:
a first link length calculator that calculates a length of a link connecting between predetermined nodes in said node series;
a link full length updater that adds the length of the link connecting between the nodes which is calculated by said first link length calculator to perform an update, and calculates a full length of said node series;
a candidate point gap calculator that calculates a gap for candidate point generation on a basis of the full length of said node series which is calculated by said link full length updater and a predetermined number of candidate points which are generated by said candidate point generator; and
a generator that generates the plurality of candidate points on said node series and at intervals of the gap for candidate point generation which is calculated by said candidate point gap calculator.

4. The character string placement device according to claim 2, wherein said character string placer includes:
an initial character position determinator that determines a placement position of a first character of said character string;
a link angle calculator that calculates an angle of a link which is determined by the placement position of the first character, which is determined by said initial character position determinator, and which connects between predetermined nodes along which said character string is to be placed;
a character placement position calculator that calculates a placement position of each character which forms said character string on as basis of the placement position of the first character, which is determined by said initial character position determinator, and the angle of the link, which is calculated by said link angle calculator;
a character-outside-link determinator that determines whether the placement position of said each character which is calculated by said character placement position calculator exists on said link; and
a character placer that sets placement coordinates on a basis of the placement position of said each character, and places said each character at the placement coordinates set thereby when said character-outside-link determinator determines with the placement position of said each character exists on said link.

5. The character string placement device according to claim 4, wherein said character stung placer includes:
an overlap determinator that determines whether the placement coordinates at which said character placer places said each character overlap previously-set placement coordinates of a character; and
a parameter updater that adds a predetermined constant to a parameter determined by said initial character position determinator to update the parameter when said overlap determinator determines that said placement coordinates overlap the previously-set placement coordinates of a character.

6. The character string placement device according to claim 2, wherein said character gap function calculator includes:
an initial character string determinator that determines a character string which is placed a first time from among a plurality of character strings placed by said character string placer;
a first Gaussian function calculator that calculates a Gaussian function value for evaluating a distance between a character string, which is not the character string which said initial character string determinator determines is placed the first time, and another character string placed at another node series, which is different from the node series on which said plurality of candidate points are placed; and
a character gap function updater that updates said character gap function value by using the Gaussian function value calculated by said first Gaussian function value calculator.

7. The character string placement device according to claim 1, wherein said angle function calculator includes:
a second Gaussian function value calculator that calculates a Gaussian function value showing a relationship between said character string and the node series along which said character string is to be placed; and an angle function updater that updates said angle function value by using the Gaussian function value calculated by said second Gaussian function value calculator.

8. A character string placement device comprising at least one processor having processing circuitry configured to:

calculate a plurality of evaluation function values, each of which shows an evaluation of placement of a character string placed at each of a plurality of candidate points on a node series;

determine at which of said plurality of candidate points to place the character string on a basis of comparison between said plurality of evaluation function values, wherein, when calculating the plurality of evaluation function values, the processing circuitry is configured to:

calculate a character gap function value for evaluating a distance between the character string placed at each of said plurality of candidate points and another character string placed at another node series, which is different from the node series on which said plurality of candidate points are placed;

calculate an angle function value showing an evaluation of an angle of the node series along which the character string is placed at each of said plurality of candidate points; and calculate said evaluation function value of the character string placed at each of said plurality of candidate points based on $F=\log P(R_{string\_idx}|S_{string\_idx})+\log P(S_{string\_idx}|\{S_{string\_idx-1}\})$, wherein F is said evaluation function value, $P(R_{string\_idx}|S_{string\_idx})$ is said angle function value, and $P(S_{string\_idx}|\{S_{string\_idx-1}\})$ is said character gap function value.

9. The character string placement device according to claim 8, wherein the processing circuitry is further configured to:

acquire character string data about said character string, and node series data about said node series;

generate said plurality of candidate points on said node series on a basis of said character string data and said node series data;

place said character string at each of said plurality of candidate points;

store said evaluation function value less than a minimum evaluation function value as said minimum evaluation function value; and store character string placement and a character string placement start point in said minimum evaluation function value.

10. The character string placement device according to claim 9, wherein the processing circuitry is further configured to:

calculate a length of a link connecting between predetermined nodes in said node series;

add the length of the link connecting between the nodes;

calculate a full length of said node series;

calculate a gap for candidate point generation on a basis of the full length of said node series and a predetermined number of candidate points; and generate the plurality of candidate points on said node series and at intervals of the gap for candidate point generation.

11. The character string placement device according to claim 9, wherein the processing circuitry is further configured to:

determine a placement position of a first character of said character string;

calculate an angle of a link which is determined by the placement position of the first character, which connects between predetermined nodes along which said character string is to be placed;

calculate a placement position of each character which forms said character string on a basis of the placement position of the first character and the angle of the link;

determine whether the placement position of said each character exists on said link;

set placement coordinates on a basis of the placement position of said each character; and place said each character at the placement coordinates set thereby when it is determined that the placement position of said each character exists on said link.

12. The character string placement device according to claim 11, wherein the processing circuitry is further configured to:

determine whether the placement coordinates at which said character placer places said each character overlap previously-set placement coordinates of a character; and add a predetermined constant to parameter when it is determined that said placement coordinates overlap the previously-set placement coordinates of a character.

13. The character string placement device according to claim 9, wherein the processing circuitry is further configured to:

determine a character string which is placed a first time from among a plurality of character strings;

calculate a Gaussian function value for evaluating a distance between a character string, which is not the character string that is placed the first time, and another character string placed at another node series, which is different from the node series on which said plurality of candidate points are placed; and update said character gap function value by using the Gaussian function value.

14. The character string placement device according to claim 8, wherein the processing circuitry is further configured to:

calculate a Gaussian function value showing a relationship between said character string and the node series along which said character string is to be placed; and update said angle function value by using the Gaussian function value.

15. The character string placement device according to claim 8, wherein the processing circuitry is further configured to:

calculate a first evaluation function value showing an evaluation of placement of the character string placed at a first candidate point on the node series and a second evaluation function value showing an evaluation of placement of the character string placed at a second candidate point on the node series; and determine at which one of the first candidate point and the second candidate point to place the character string on a basis of comparison between the first evaluation function value and the second evaluation function value.

* * * * *